United States Patent [19]
Ikedo et al.

[11] Patent Number: 6,118,644
[45] Date of Patent: Sep. 12, 2000

[54] ELECTROMAGNETIC ACTUATOR AND IMAGE PICKUP APPARATUS

[75] Inventors: Yuji Ikedo; Atsushi Yamane; Hiroyuki Watanabe, all of Tokorozawa; Masakuni Iwanaga, Higashiyamato, all of Japan

[73] Assignees: Pioneer Electronic Corporation; Casio Computer Co., Ltd., both of Tokyo, Japan

[21] Appl. No.: 08/959,616

[22] Filed: Oct. 28, 1997

[30] Foreign Application Priority Data

Oct. 30, 1996 [JP] Japan .................................. 8-288362
Dec. 17, 1996 [JP] Japan .................................. 8-353376

[51] Int. Cl.$^7$ .................................................. H01H 47/22
[52] U.S. Cl. ........................................... 361/143; 361/210
[58] Field of Search .................................. 361/143, 147, 361/148, 160, 206, 210

[56] References Cited

U.S. PATENT DOCUMENTS

| | | | |
|---|---|---|---|
| 4,249,170 | 2/1981 | Cham et al. | 361/210 |
| 4,279,008 | 7/1981 | Del Picchia et al. | 361/210 |
| 4,329,607 | 5/1982 | Rosain et al. | 310/82 |
| 4,841,407 | 6/1989 | Baba et al. | 361/210 |
| 4,905,031 | 2/1990 | Mody | 361/147 |
| 5,040,089 | 8/1991 | Sasaki | 361/160 |
| 5,363,270 | 11/1994 | Wahba | 361/210 |

FOREIGN PATENT DOCUMENTS 39 36 662 A1   6/1991   Germany .

*Primary Examiner*—Fritz Fleming
*Attorney, Agent, or Firm*—Morgan, Lewis & Bockius LLP

[57] ABSTRACT

An electromagnetic actuator has a large driving force and a good response speed and an image pickup apparatus obtains an image of a high resolution even by using a solid state image pickup device with a small number of pixels. The actuator comprises permanent magnetic field generating units for generating permanent magnetic fields and a current path forming unit which is relatively movable for the permanent magnetic field generating units and forms a current path which crosses the permanent magnetic fields by a current according to an input control signal. The permanent magnetic field generating units of the actuator generate two permanent magnetic fields in the directions which cross each other by, for example, two pairs of magnets. The current path forming unit has two coils each crossing the permanent magnetic field and winding shafts of those coils exist almost on the same line. A driven member is driven by a relative movement between the magnets and the coils by two electromagnetic forces which are generated between the magnets and the coils. In the image pickup apparatus, first and second electromagnetic actuators are driven and controlled by a control unit, a first parallel flat plate is inclined every four exposures, an image of an object is deviated in four directions, a second parallel flat plate is inclined in four directions every exposure, the image of the object is deviated in four directions, and the image data obtained by the exposure of four times is synthesized, thereby forming synthetic image data of one picture plane.

17 Claims, 26 Drawing Sheets

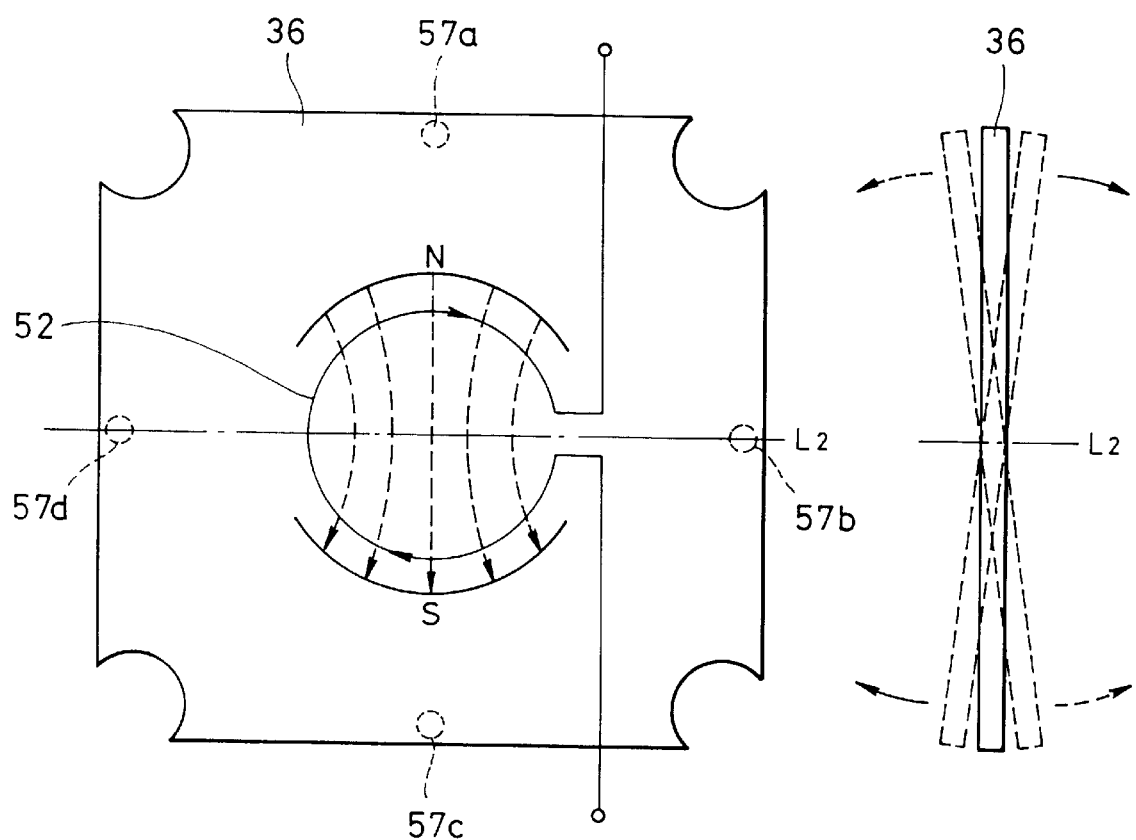

FIG.25

| OPERATING FORMAT | 1ST | 2ND | 3RD | 4TH |
|---|---|---|---|---|
| POTATING (DEPRESSING) DIRECTION | ↖ | ↗ | ↘ | ↙ |
| TA INPUT VOLTAGE | + ← | - --→ | - --→ | + ← |
| TB INPUT VOLTAGE | + ↑ | + ↑ | - ↓ | - ↓ |
| UPPER FULCRUM | 56c | 56d | 56a | 56b |
| LOWER FULCRUM | 57a, 57d | 57a, 57b | 57b, 57c | 57c, 57d |

ANGLE OF INCLINATION $\theta_1$

ANGLE OF INCLINATION $\theta_1$

ANGLE OF INCLINATION $\theta_2$

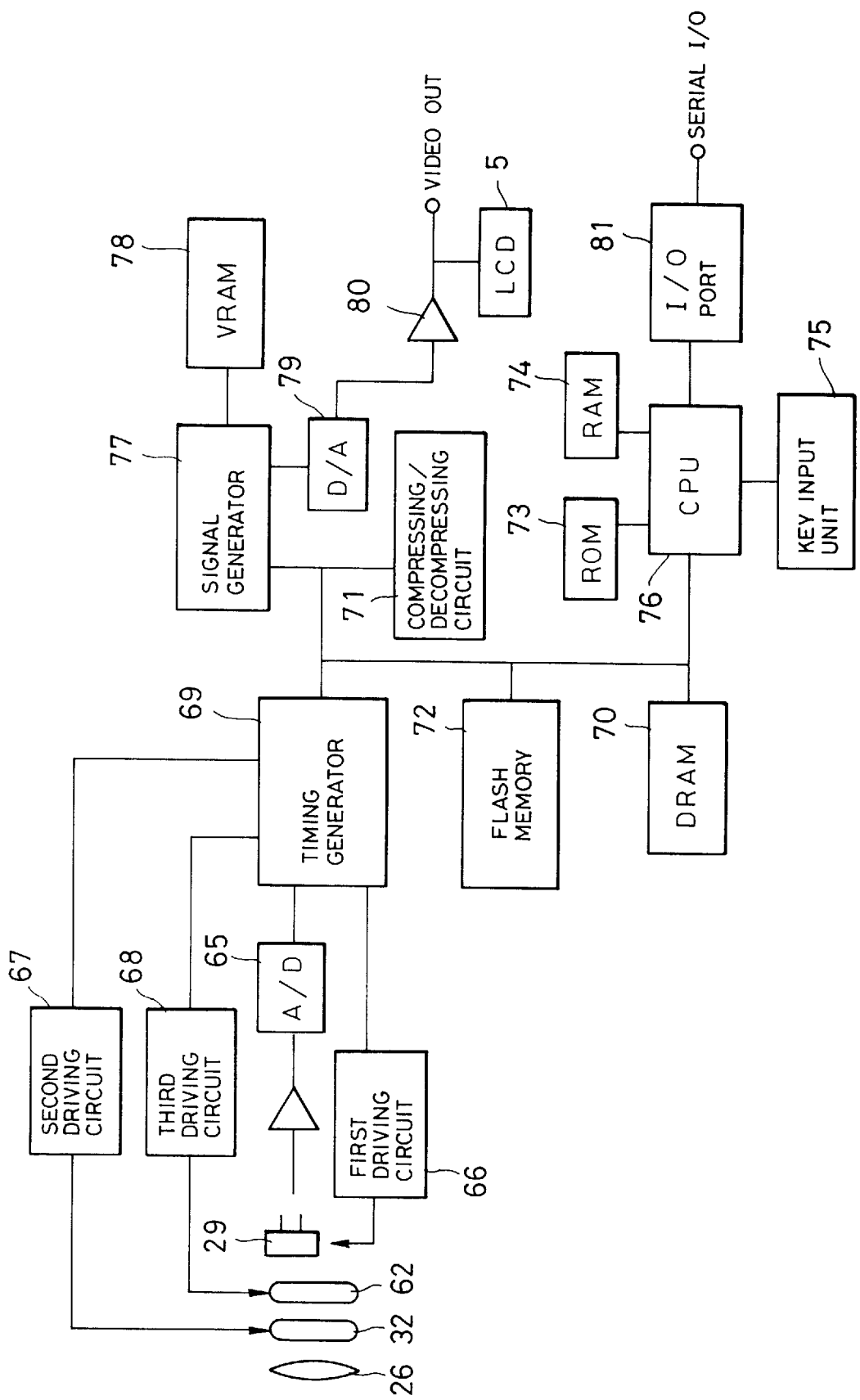

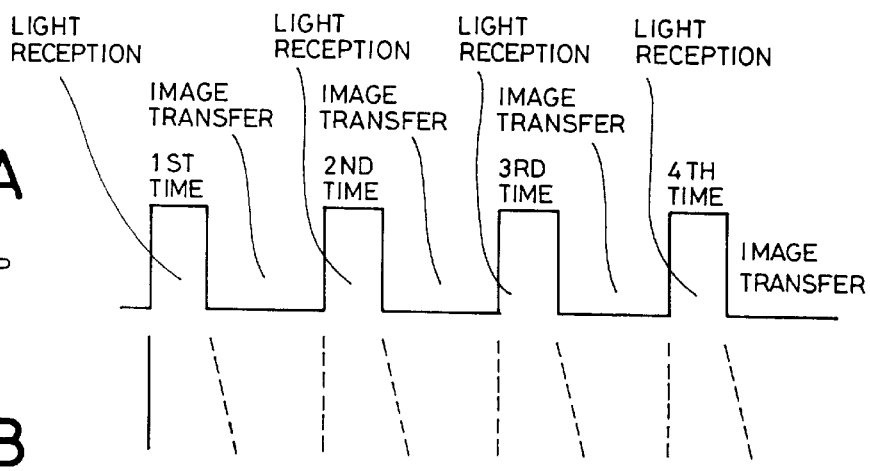

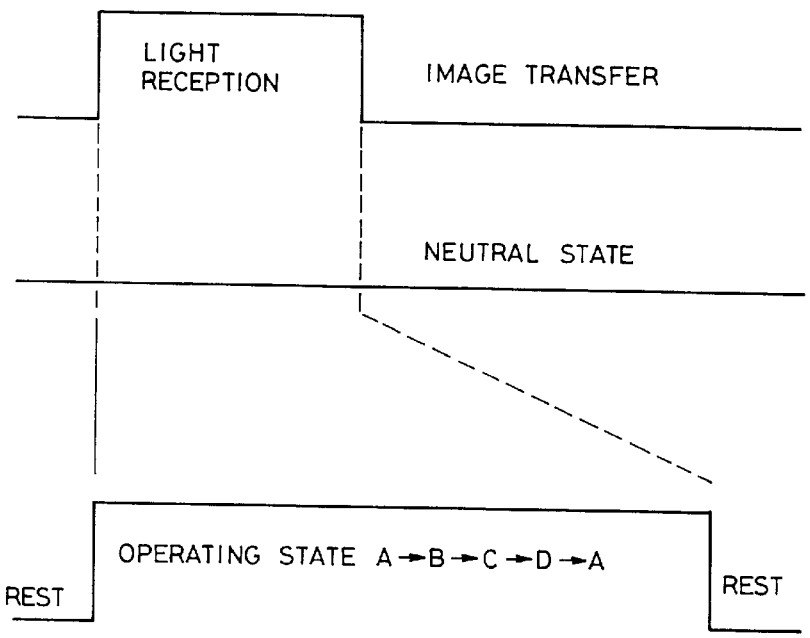

ELECTROMAGNETIC ACTUATOR AND IMAGE PICKUP APPARATUS

BACKGROUND OF THE INVENTION

1. Field of the Invention

The invention relates to an electromagnetic actuator and, more particularly, to an image pickup apparatus which is used in an electronic camera or a video camera.

2. Description of Related Art

Actuator for generating a driving force utilizing an electromagnetic inductive action is generally used as a mechanism for driving optical parts such as a lens, a mirror, a prism, which are used in an image pickup apparatus or the like or small parts such as electronic parts or the like.

Since the conventional electromagnetic actuator has a structure constituting one driving system based on a driving force formed by the whole actuator, the driving force becomes small and there is a tendency that a response speed in generation of the driving force in response to an input control signal is slow. In association with it, in many cases, the actuator's performance in stably positioning the driven part to a predetermined driving position remains at a poor level.

In the image pickup apparatus which is used in an electronic camera, hitherto, a charge transfer unit such as a CCD (charge coupled device) or the like and a photosensitive unit are provided, the photosensitive unit has a solid state image pickup device in which photosensitive pixels are arranged in the vertical and lateral directions at a predetermined pixel pitch. An image of an object is converted into an electric signal by the solid state image pickup device and is outputted, and the output signal is formed as an image signal.

In the image pickup apparatus, however, since a resolution when an image of an object is photographed is determined by the number of pixels of the solid state image pickup device, it is necessary to increase the number of pixels or to raise the degree of integration of the solid state image pickup device in order to perform a high resolution photographing. However, there are problems that when the number of pixels is increased, the cost of the solid state image pickup device increases even if the degree of integration of the solid state image pickup device is not raised, or the degree of integration is raised with the size of photo-sensing surface of the solid state pickup devices unchanged, a high working precision is required, so that the costs of the solid state image pickup device further rise.

OBJECT AND SUMMARY OF THE INVENTION

The invention is made to solve the problems described above, and it is an object of the invention to provide an electromagnetic actuator which can obtain a large driving force.

Another object of the invention is to provide an electromagnetic actuator in which a response speed in generating a driving force in response to an input control signal is increased.

A further object of the invention is to provide an electromagnetic actuator in which a settling performance to a predetermined driving position is good.

A still further object of the invention is to enable the capture of a high resolution image even by using a solid state image pickup device having a small number of pixels.

According to the invention, there is provided an electromagnetic actuator comprising: permanent magnetic field generating means for generating a permanent magnetic field; and current path forming means which is relatively movable for the permanent magnetic field generating means and forms a current path that crosses the permanent magnetic field by a current according to an input control signal, wherein the permanent magnetic field generating means generates at least two permanent magnetic fields in directions which cross each other, the current path forming means has at least two coils each of which crosses those at least two permanent magnetic fields, and winding shafts of the at least two coils exist on almost the same line and drive a driven member by a relative movement that is caused between the permanent magnetic field generating means and the current path forming means by at least two electromagnetic forces which are generated between the permanent magnetic field generating means and the coils.

An image pickup apparatus according to the invention comprises: a transparent parallel flat plate which is arranged on an optical path between an object and a solid state image pickup device; an actuator for changing an emitting position for an incident position of a light by inclining the transparent parallel flat plate in a plurality of predetermined directions for an optical axis; control means for driving the actuator so as to incline the parallel flat plate every exposure of a plurality of number of times; synthesizing means for forming synthetic image data of one picture plane by synthesizing image data which is obtained by the exposure of a plurality of number of times; and storage means for storing the synthetic image data formed by the synthesizing means.

According to the invention, therefore, the actuator is driven by the control means, the parallel flat plate is inclined every exposure of a plurality of number of times, and the emitting position for the incident position of the light is changed, thereby sequentially deviating the image of the object on the solid state image pickup device, and the synthetic image data of one picture plane is formed by synthesizing the image data derived by the exposure of a plurality of number of times by the synthesizing means, so that an image of a high resolution can be obtained even when a solid state image pickup device having a small number of pixels is used.

In this case, if the apparatus has a first mode for synthesizing the image data derived by the exposure of a plurality of number of times and storing the resultant synthetic image data of one picture plane into the storage means and a second mode for storing the image data obtained by the exposure of one time into the storage means as image data of one picture plane as it is, an image of a high resolution can be obtained by the first mode, and an image of a low resolution can be obtained by the second mode.

If a low pass filter having characteristics which are different in the first mode and the second mode is provided between the object and the solid state image pickup device, a deterioration in picture quality due to a moire and a color false signal which are caused by a high band frequency that is equal to or higher than a Nyquist frequency can be prevented and a good image can be obtained in any one of the first and second modes.

Furthermore, by inclining the parallel flat plate in a plurality of predetermined directions for the optical axis for an exposing time of one time, even if a low pass filter is not separately provided, the function of the low pass filter can be also performed and a structure can be simplified.

BRIEF DESCRIPTION OF THE DRAWINGS

FIGS. 6 and 7 show an optical principle of a transparent parallel flat plate in FIG. 4, in which FIG. 6 is a diagram showing an optical path state in a state in which the parallel flat plate is perpendicularly arranged for an optical axis and FIG. 7 is a diagram showing an optical path state in a state in which the parallel flat plate is inclined for the optical axis;

FIGS. 11 and 12 are diagrams showing the first fixed member in FIG. 10, in which FIG. 11 shows a side elevation and FIG. 12 is a cross sectional view taken along the line A—A in FIG. 10;

FIG. 15 is a cross sectional view taken along the line B—B in FIG. 13;

FIGS. 17 and 18 are diagrams showing the movable member in FIG. 16, in which FIG. 17 is a side view and FIG. 18 is a cross sectional view taken along the line C—C in FIG. 16;

FIGS. 20 and 21 are diagrams showing an operating state between the first fixed member and the movable member in FIG. 19, in which FIG. 20 is a plan view of its model and FIG. 21 is a side view of the model;

FIGS. 22 and 23 are diagrams showing an operating state between the second fixed member in FIG. 19 and the movable member, in which FIG. 22 is a plan view of its model and FIG. 23 is a side view of the model;

FIG. 25 is a diagram showing a table of the operating state corresponding to each operating mode of the electromagnetic actuator in FIG. 9;

FIGS. 29 and 30 show an inclining direction and an angle of inclination of the second parallel flat plate of the second parallel flat unit by arrows, in which FIG. 29 is a diagram showing a state of an inclination angle $\theta_1$ and FIG. 30 is a diagram showing a state of an inclination angle $\theta_2$;

FIG. 31 is a block diagram showing a circuit construction of the electronic camera in FIG. 1;

FIGS. 32A, 32B, and 32C are diagrams showing time charts at the time of a high resolution photographing in the electronic camera in FIG. 1; and FIGS. 33A, 33B, and 33C are diagrams showing time charts at the time of a low resolution photographing in the electronic camera in FIG. 1.

DETAILED DESCRIPTION OF THE PREFERRED EMBODIMENTS

Embodiment in which an image pickup apparatus of the invention is applied to an electronic camera will now be described hereinbelow with reference to FIGS. 1 to 33C.

Figure 1:
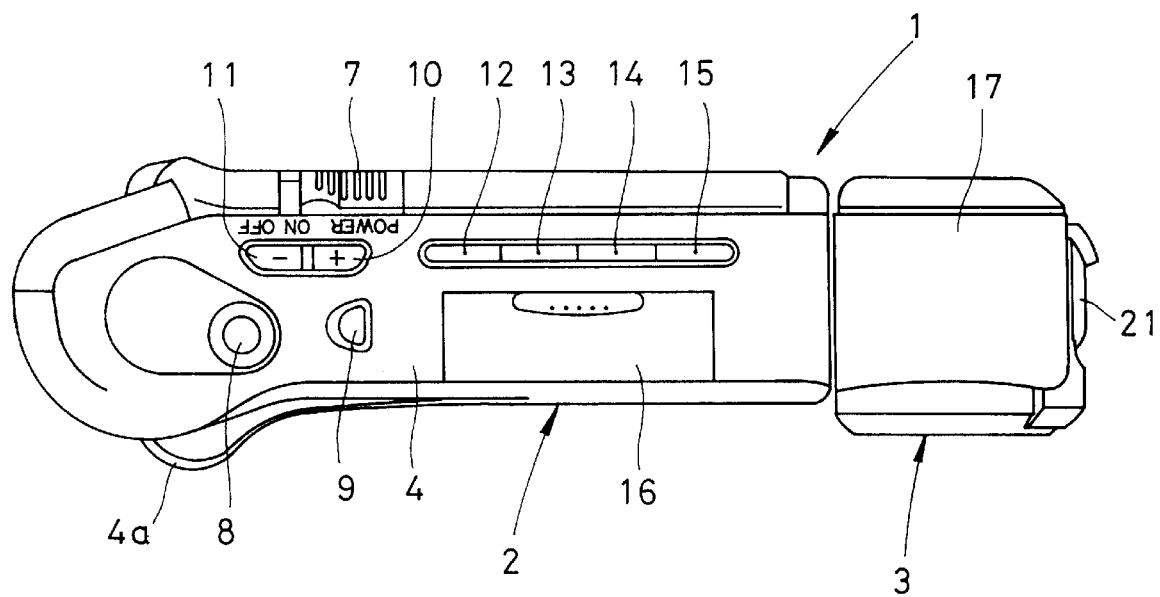
FIG. 1 is an plan view showing an external appearance of an embodiment of an electronic camera to which the invention is applied.
Figure 2:
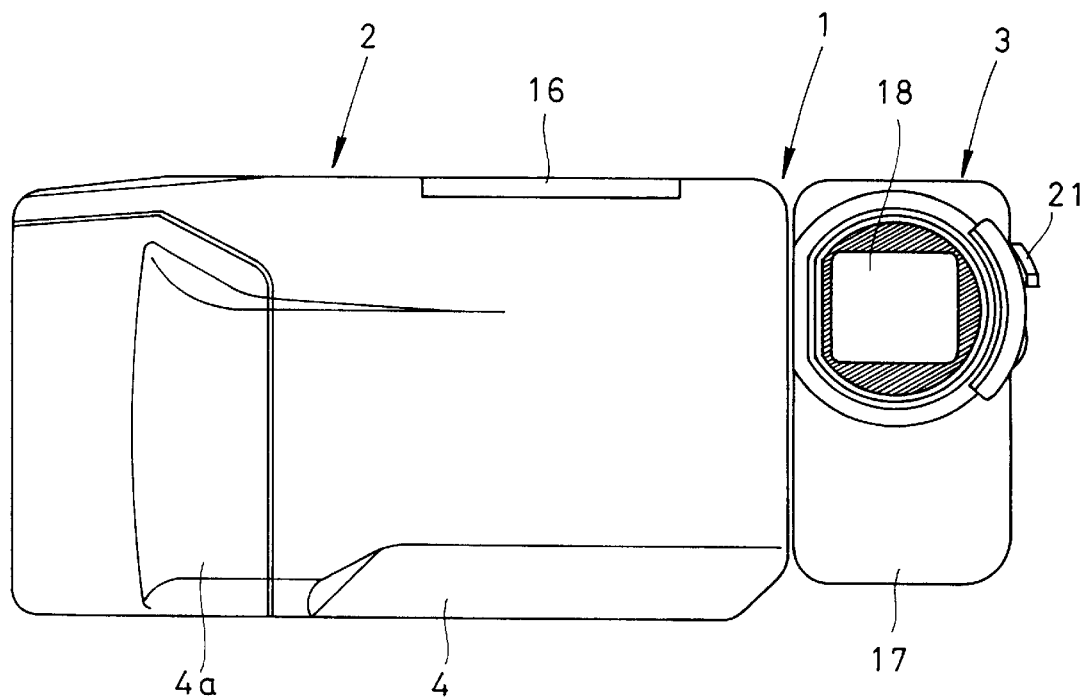
FIG. 2 is an front view showing an external appearance of the electronic camera shown in FIG. 1.
Figure 3:
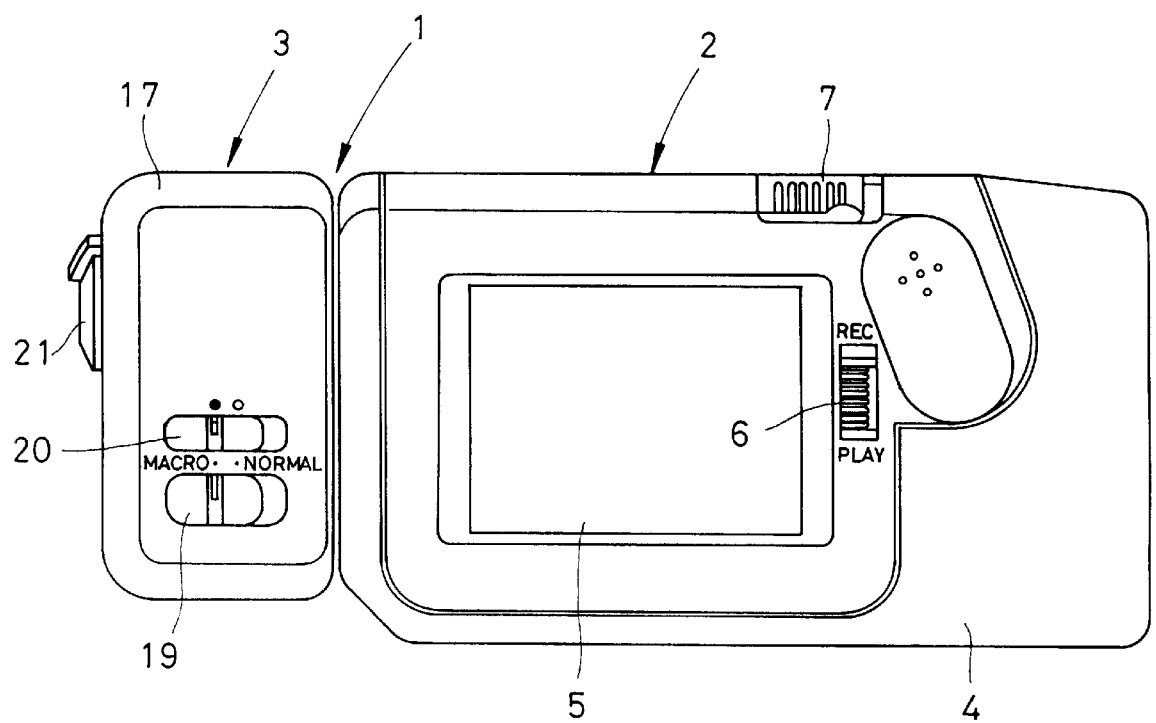
FIG. 3 is an rear view showing an external appearance of the electronic camera shown in FIG. 1.

FIGS. 1 to 3 are external views of the electronic camera of the invention. An electronic camera 1 shown in the diagrams is made up of two blocks of a main unit 2 and a camera unit 3.

The main unit 2 has a main unit case 4. As shown in FIG. 3, a liquid crystal display (LCD) panel 5 to display a photographed image and a function key 6 are provided on the rear side of the main unit case 4. As shown in FIG. 1, a power switch 7, a shutter button 8, a delete key 9, a plus key 10, a minus key 11, a mode key 12, a display key 13, a zoom key 14, and a self timer key 15 are provided on the upper surface of the main unit case 4 and an opening/closing cover 16 is also provided. An external power source terminal, a video output terminal, a digital terminal, and the like (not shown) are provided on the inside of the opening/closing cover 16. In FIGS. 1 and 2, in order to enable a photographer to easily grasp the electronic camera with the right hand, a grip portion 4a in an expanded grip shape is formed in the left side portion of the main unit case 4. The grip portion 4a has a structure in which a plurality of battery cells (not shown) are enclosed.

The camera unit 3 has a camera casing 17. An opening 18 for photographing is provided in the front surface of the camera casing 17 as shown in FIG. 2, and a focusing switch 19 and a diaphragm change-over switch 20 are provided in the rear surface as shown in FIG. 3. As shown in FIGS. 1 and 3, a switching lever 21 for switching between a telescopic view (TELE) and a wide angle view (WIDE) is rotatably attached to the side surface of the camera casing 17.

In FIGS. 1 and 2, the camera unit 3 is rotatably attached to the right side surface of the main unit 2. That is, the camera unit 3 is rotatably attached to the main unit 2 in a manner such that the camera unit 3 is rotated forward by 90° relative to the main unit 2, the opening portion 18 for photographing faces just downward, the camera unit 3 is rotated backward by 180° for the main unit 2, and the opening portion 18 for photographing is directed to the photographer's side.

Figure 4:
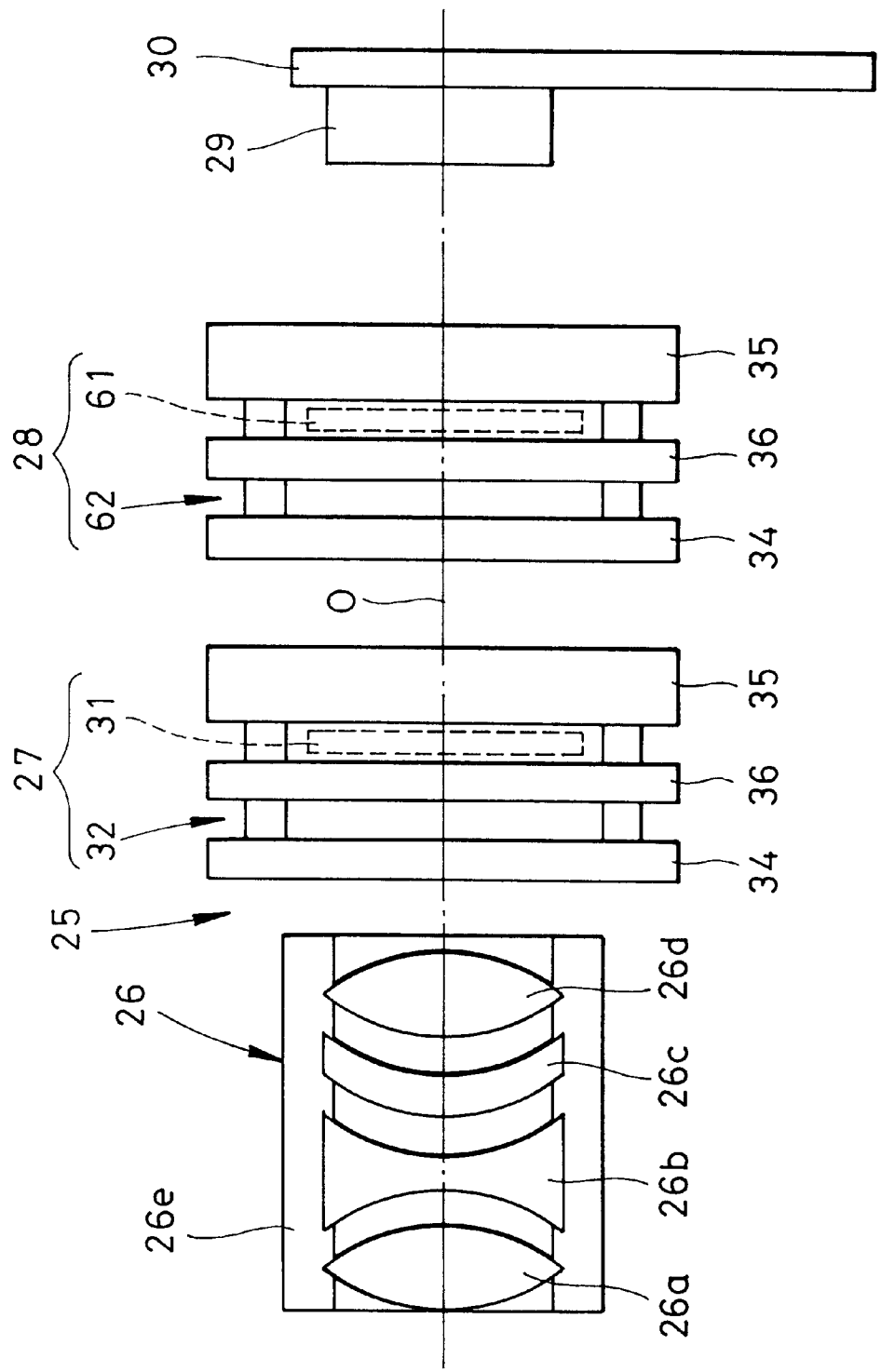
FIG. 4 is a schematic diagram showing the structure of an image pickup apparatus provided in a camera unit in FIG. 2.

An image pickup apparatus 25 shown in FIG. 4 is provided in the camera unit 3. The image pickup apparatus 25 has a structure such that in correspondence to the opening portion 18 provided for the camera casing 17, a photographing lens unit 26, a first parallel flat plate unit 27 for pixel interpolation, a second parallel flat plate unit 28 for a low pass filter, and a solid state image pickup device 29 are sequentially arranged along an optical axis O from the object side.

The photographing lens unit 26 forms the image of the object onto the solid state image pickup device 29 through the first and second parallel flat plate units 27 and 28 and comprises a plurality of lenses 26a to 26d. Each of the lenses 26a to 26d is fixed into the camera casing 17 by a lens frame 26e.

Figure 5:
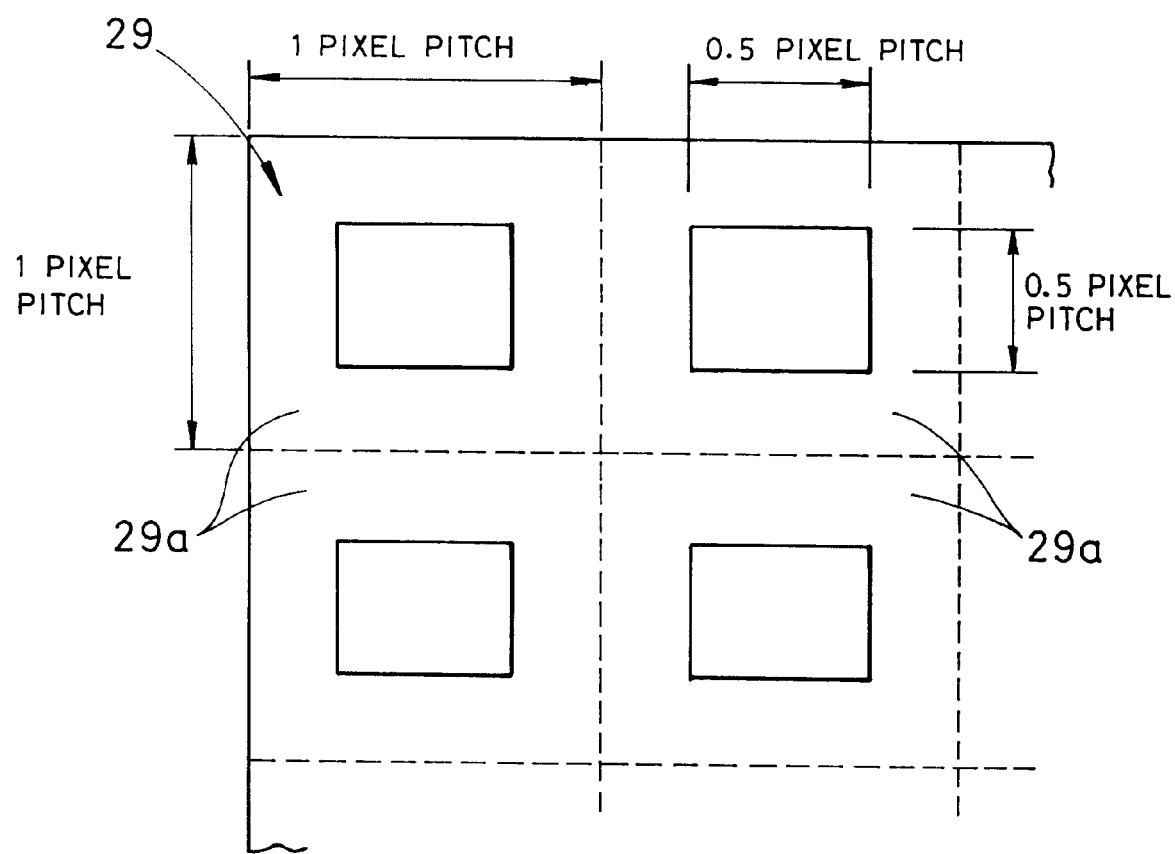
FIG. 5 is a diagram showing a main section of an array state of photosensitive pixels of a solid state image pickup device in FIG. 4.

The solid state image pickup device 29 has a charge transfer unit such as a CCD or the like and a photosensitive unit in which photosensitive pixels 29a are arranged at a predetermined pitch in the vertical and lateral directions. The image pickup device 29 receives the light from the object, converts the light into an electric signal, and generates the electric signal and is attached onto a circuit board 30 provided in the camera casing 17. In this case, as shown in FIG. 5, the photosensitive pixels 29a are arranged in the vertical and lateral directions at a pitch of one pixel. An opening width of each photosensitive pixel 29a is set to a pitch of 0.5 pixel in each of the vertical and lateral directions and an opening ratio is set to 25%.

The first parallel flat plate unit 27 serves a function as a pixel interpolating apparatus. The second parallel flat plate unit 28 serves a function as a low pass filter. Both of the first and second parallel flat plate units 27 and 28, however, have substantially the same structure and the first parallel flat plate unit 27 will now be described.

The first parallel flat plate unit 27 has a transparent parallel flat plate 31 arranged on the optical axis O and an electromagnetic actuator 32 for inclining the transparent parallel flat plate 31 in four directions for the optical axis O and has a structure in which they are arranged between the photographing lens unit 26 and solid state image pickup device 29.

Figure 6:
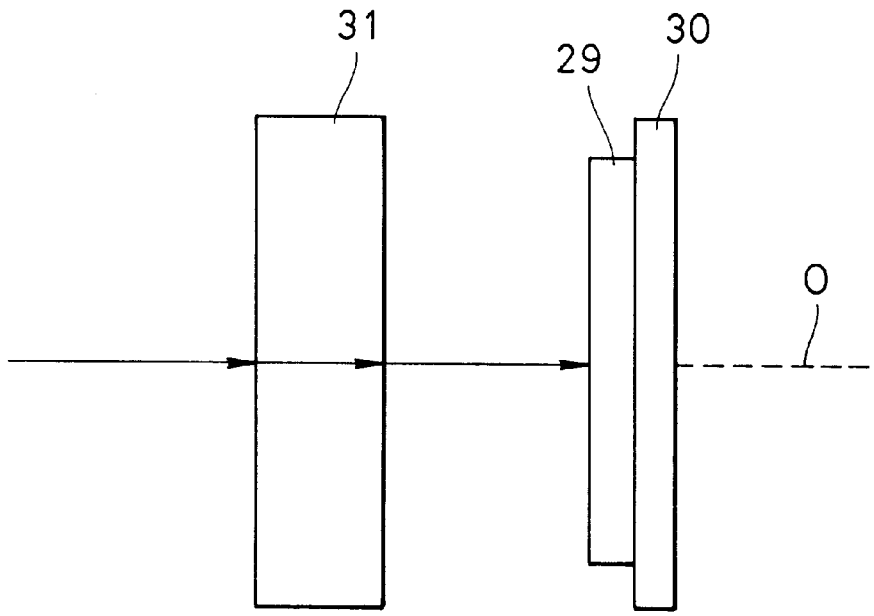
Figure 7:
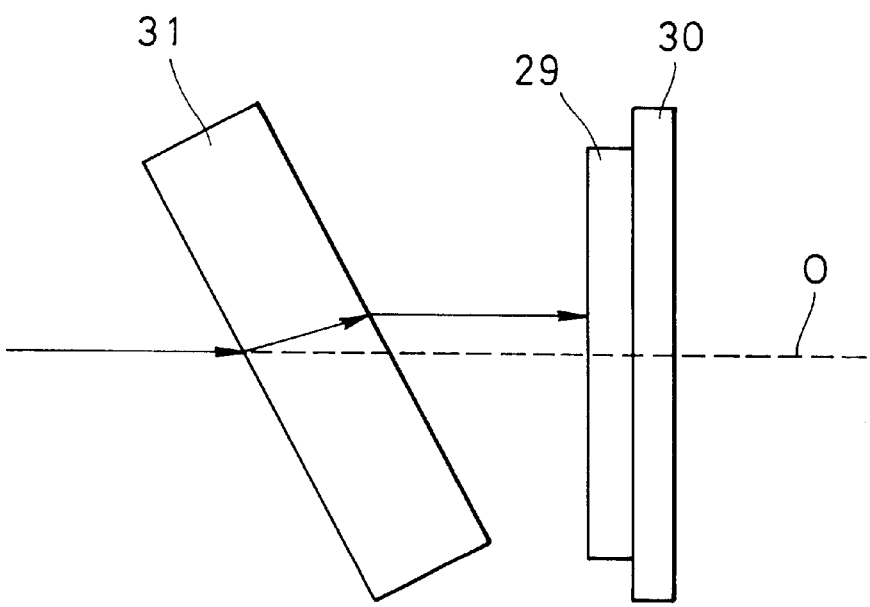
Figure 8:
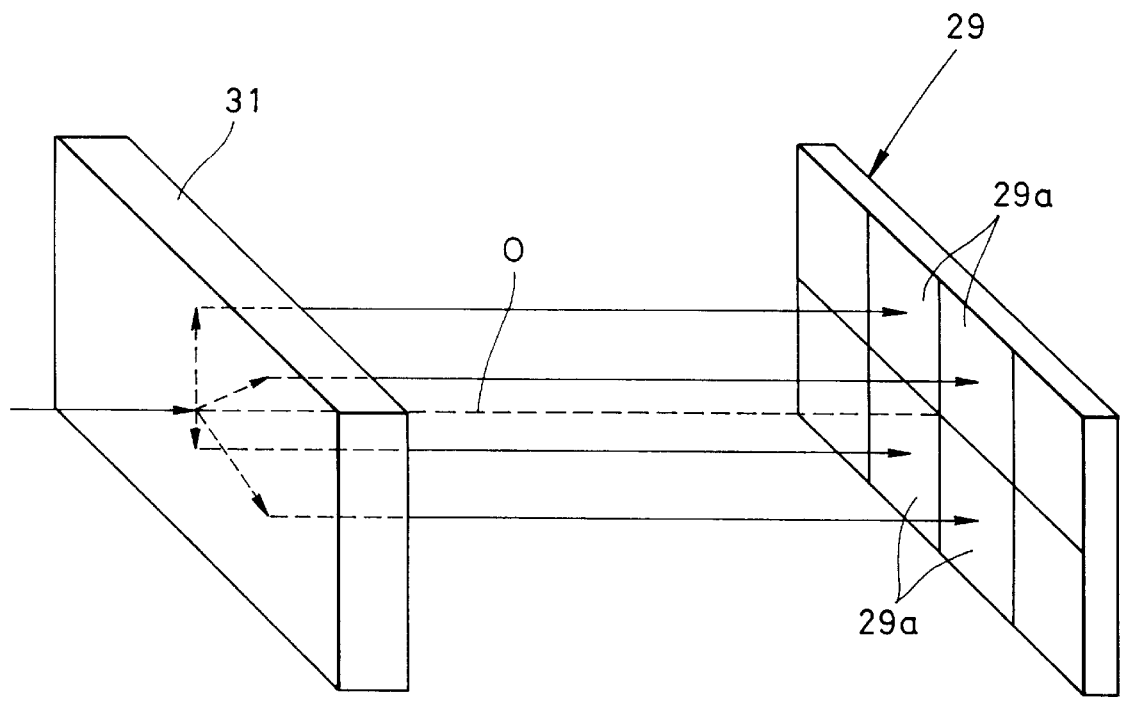
FIG. 8 is a diagram showing a state in which an emitted light beam is deviated in four directions in accordance with the inclining direction of the transparent parallel flat plate in FIGS. 6 and 7.

As shown in FIG. 6, when the transparent parallel flat plate 31 is perpendicular to the optical axis O, the incident light which is parallel to the optical axis O perpendicularly enters the plate 31 and goes straight as it is. As shown in FIG. 7, however, when the transparent parallel flat plate 31 is inclined for the optical axis O, the incident position and emitting position of the light are deviated. That is, although the incident light and the emitting light are parallel, the emitting light is emitted at an angle that is deviated in the inclining direction of the parallel flat plate 31 for the incident light. A deviation amount in this instance is determined by an angle of inclination of the parallel flat plate 31 so long as a thickness of parallel flat plate 31 is constant when it is assumed that the incident light is in parallel with the optical axis O. As the inclination angle is larger, the deviation amount also increases. When the transparent parallel flat plate 31 is inclined in four directions, which will be explained later, as shown in FIG. 8, the plate 31 changes the light from the object in four directions and allows the lights to enter the solid state image pickup device 29.

Figure 9:
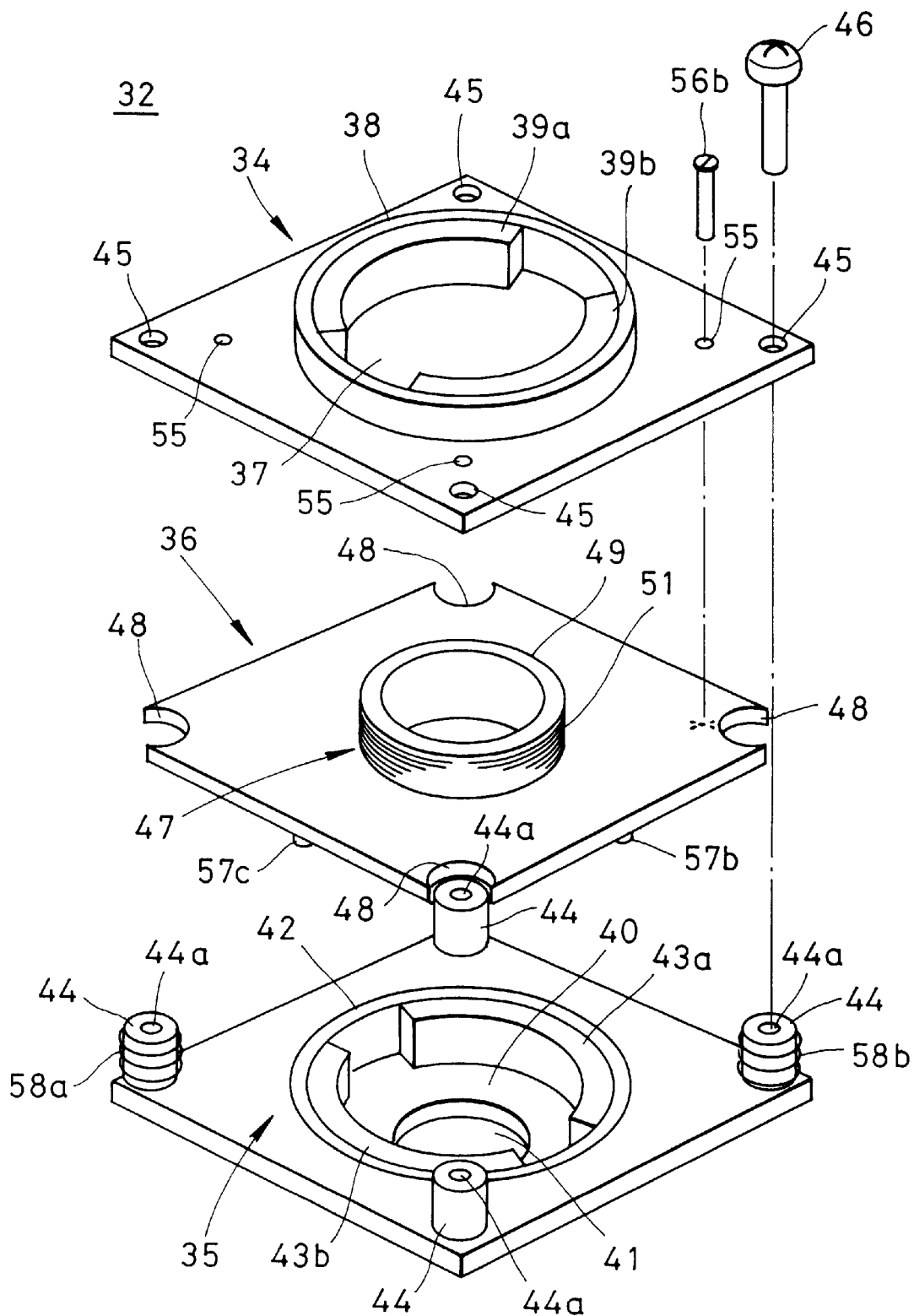
FIG. 9 is an exploded perspective view of an electromagnetic actuator of a first parallel flat plate unit in FIG. 4.

FIG. 9 is a perspective view of each member showing the structure of the electromagnetic actuator in the embodiment according to the invention.

As shown in FIG. 9, the electromagnetic actuator 32 comprises a first fixed member (fixing plate) 34, a second fixed member 35, and a movable member (movable plate) 36 arranged between them and has a structure such that the transparent parallel flat plate 31 is attached to the center of the movable member 36.

Figure 10:
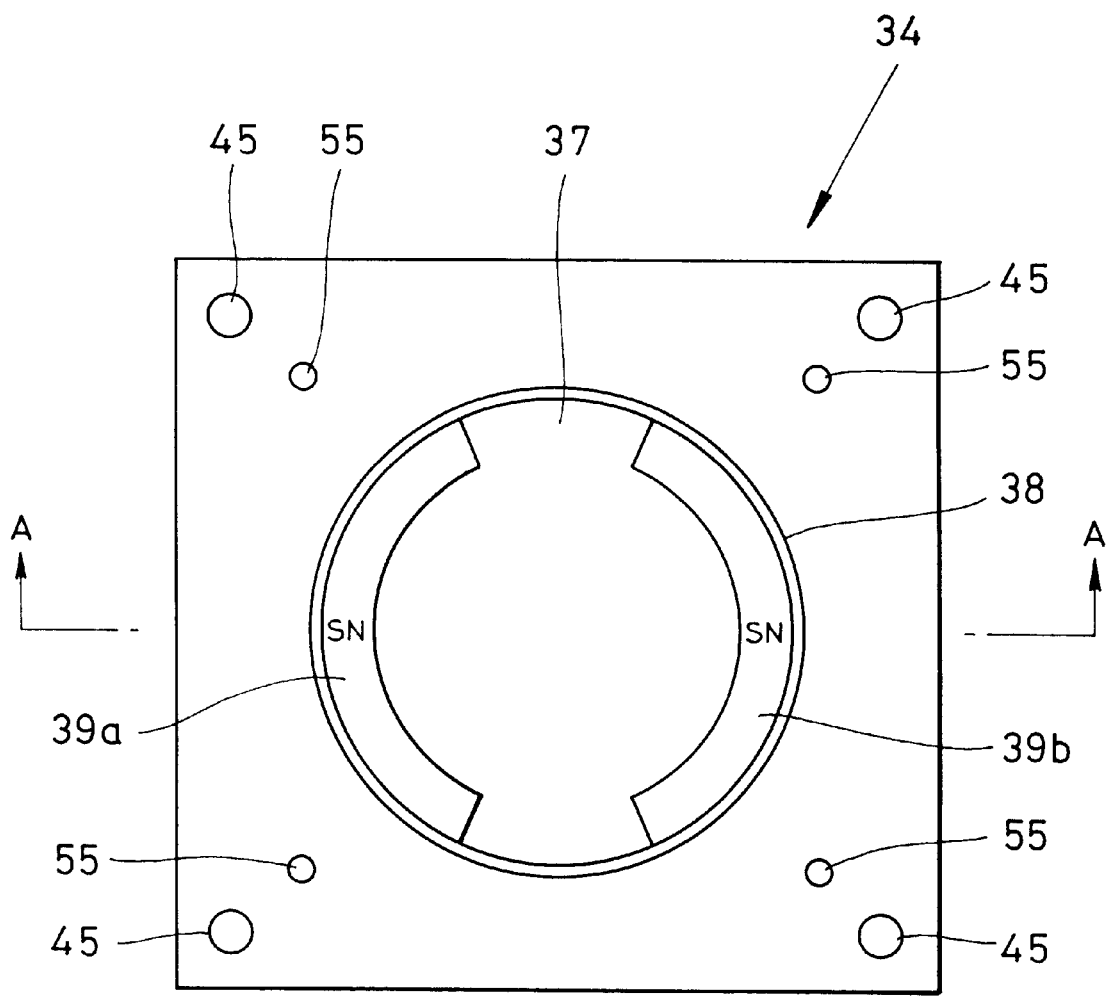
FIG. 10 is a plan view of a first fixed member in FIG. 9.
Figure 11:
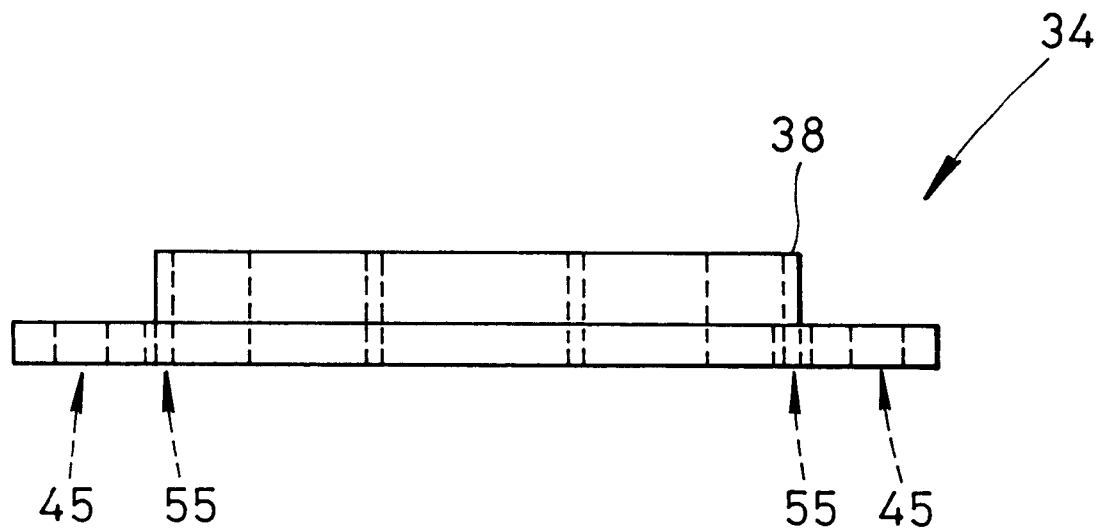
Figure 12:
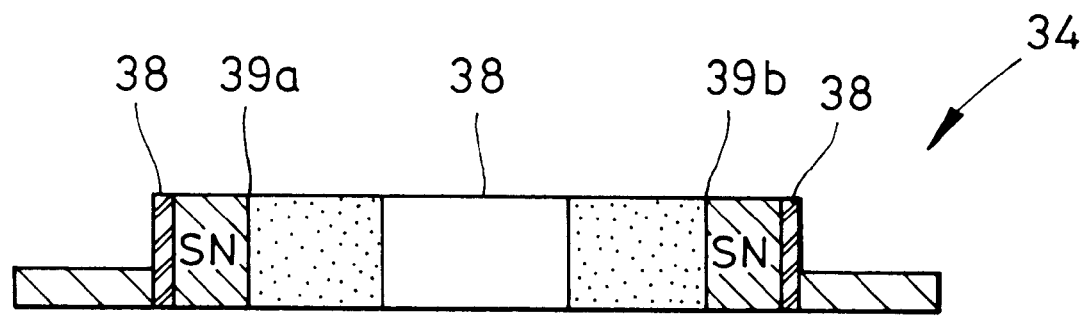

As shown in FIGS. 10, 11, and 12, the first fixed member 34 has an almost regular quadrangle. A circular hole 37 in which an intersection of two diagonal lines is set to a center is formed in the center portion of the first fixed member 34. An annular yoke 38 is attached to an inner peripheral surface of the circular hole 37. A first magnet 39a and a second magnet 39b are attached to an inner surface of the yoke 38 so as to face each other. In this case, the yoke 38 is made of a magnetic material and its width is larger than a thickness of first fixed member 34. The yoke 38 is projected to the side opposite to the movable member 36.

Figure 13:
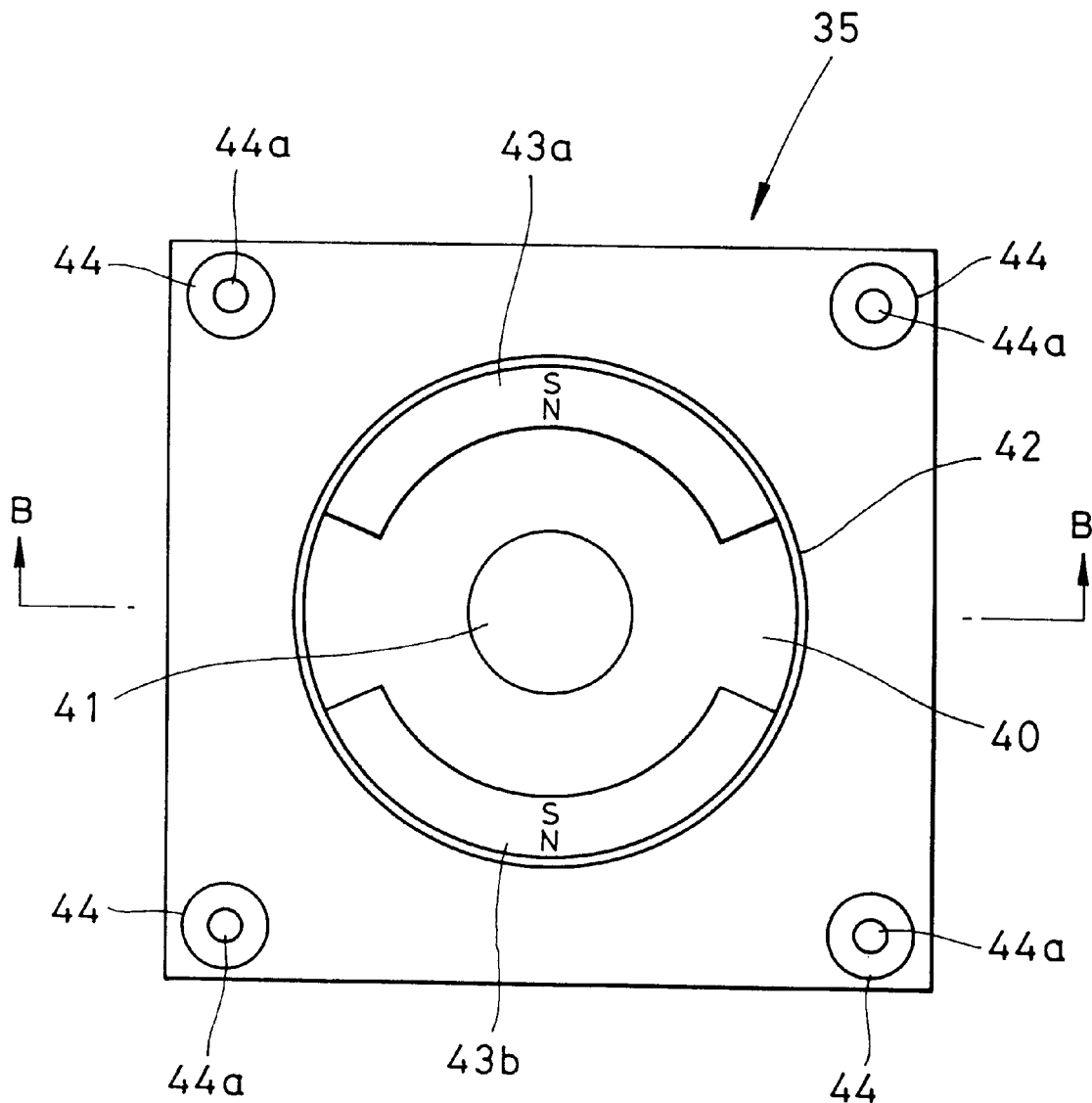
FIG. 13 is a plan view of a second fixed member in FIG. 9.
Figure 14:
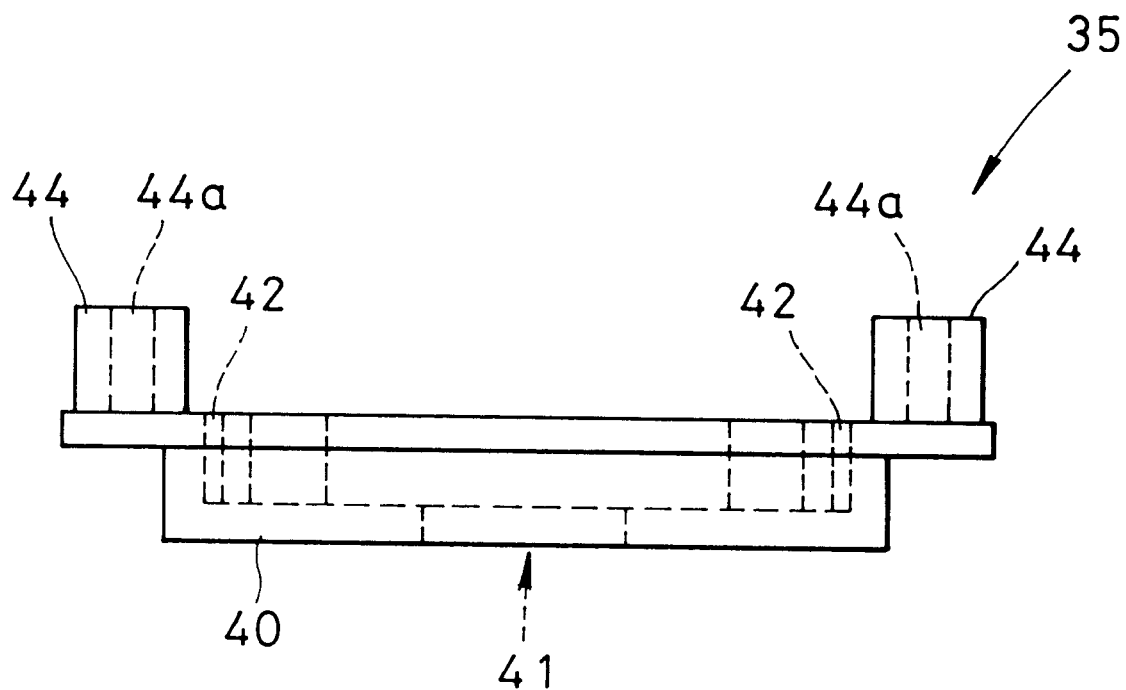
FIGS. 14 and 15 are diagrams showing the second fixed member in FIG. 11, in which FIG. 14 iss a side view
Figure 15:
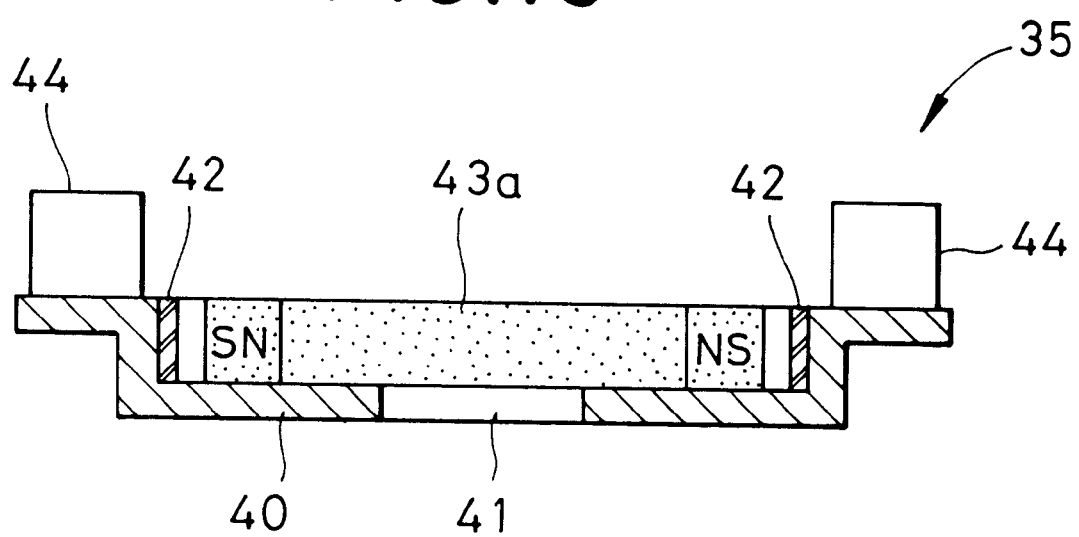

As shown in FIGS. 13, 14, and 15, the second fixed member 35 has a structure almost similar to the first fixed member 34. A circular attaching concave portion 40, however, is formed in a center portion of the first fixed member 34 corresponding to the circular hole 37 so as to be projected to the side opposite to the movable member 36. A circular hole 41 for light transmission is formed at the center of a bottom portion of the attaching concave portion 40. An annular yoke 42 is attached to the inner peripheral surface of the attaching concave portion 40. A first magnet 43a and a second magnet 43b are attached to the inner surface of the yoke 42 so as to face each other.

The first fixed member (fixing plate) 34 uses a flat member, as a base board, which is formed by molding a resin or by pressing a metal flat plate or by mechanically working an aluminum material.

Although the second fixed member 35 also has a fundamental structure almost similar to the first fixed member 34, it uses a concave cross sectional member, as a base board, which is formed by molding a resin or by pressing an iron flat plate or by mechanically working an aluminum material.

The first magnets 39a and 43a and second magnets 39b and 43b attached to the first and second fixed members 34 and 35 correspond to permanent magnetic field generating means and each of them has the same width as that of each of the yokes 38 and 42, has the same cross sectional area, and is formed in an almost same arc shape. The first magnets 39a and 43a have the N pole on the inside and the S pole on the outside. The second magnets 39b and 43b have the S pole on the inside and the N pole on the outside. The first magnet 39a and second magnet 39b in the first fixed member 34 are arranged in a symmetrical state as shown in the right and left positions in FIG. 10, so that the magnetic flux is distributed in the left to right direction (A—A line direction) where both of them almost face each other (refer also to FIG. 12). The first magnet 43a and second magnet 43b in the second fixed member 35 are arranged in a symmetrical state as shown in the upper and lower positions in FIG. 11, so that the magnetic flux is distributed in the upper/lower direction where both of them almost face each other (see FIG. 22).

In other words, between the first magnet 39a and second magnet 39b in the first fixed member 34, the magnetic flux is distributed almost in the first direction (A—A direction) as a direction of one of the sides which face each other in the main surface of the flat member. Between the first magnet 43a and second magnet 43b in the second fixed member 35, the magnetic flux is distributed in the direction which almost perpendicularly crosses the first direction, namely, in the second direction (direction perpendicular to the B—B direction) as a direction of the other one of the sides which face each other in the main surface of the flat member.

Figure 19:
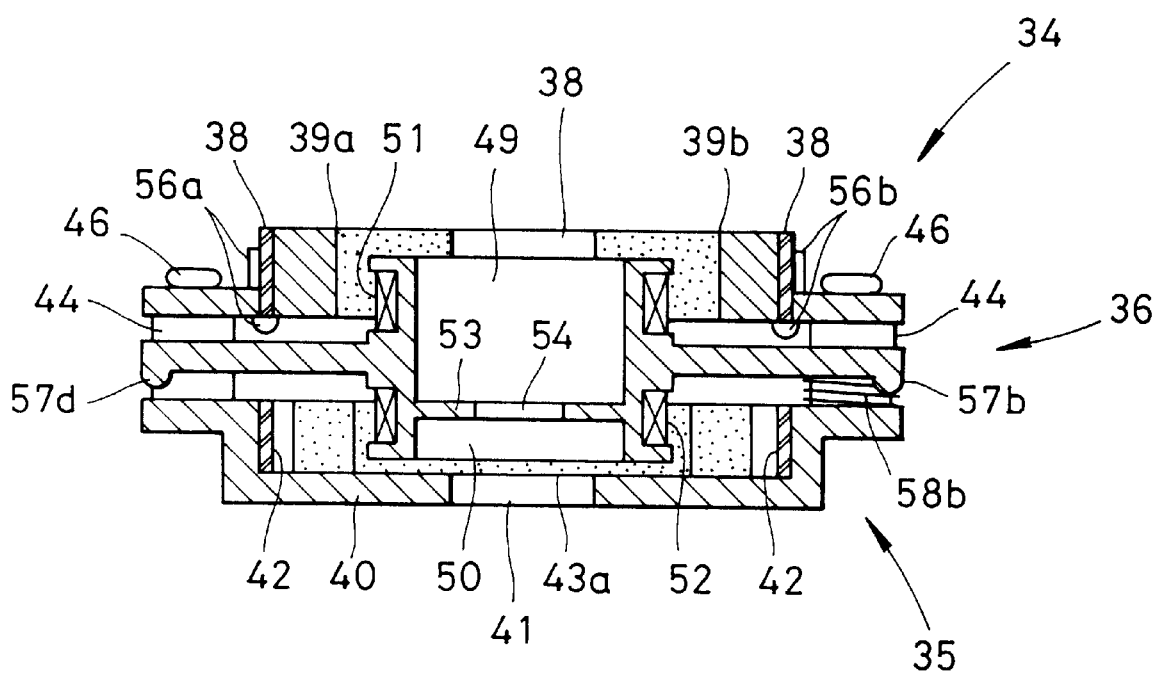
FIG. 19 is a cross sectional view of an assembling state of the electromagnetic actuator in FIG. 9.

In a state in which the first fixed member 34 is mounted on the supporting pipes 44 formed at four corners of the second fixed member 35, the first fixed member 34 and second fixed member 35 are mutually attached with a gap corresponding to a length of supporting pipe 44 as shown in FIG. 19 by spirally inserting clamping screws 46 into screw holes 44a of the supporting pipes 44 via through-holes 45 formed at four corners of the first fixed member 34 in correspondence to the supporting pipes 44.

Figure 16:
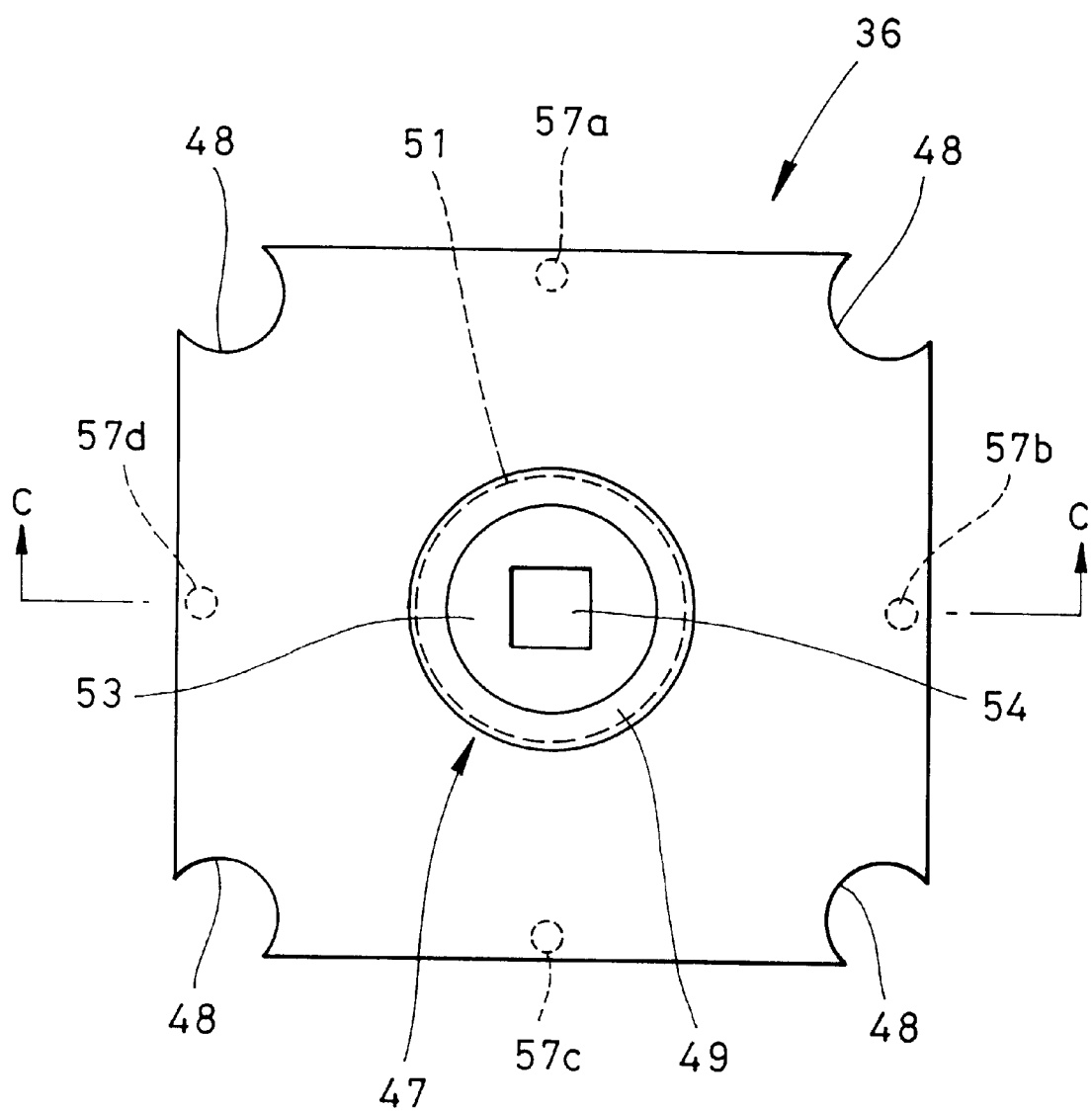
FIG. 16 is a plan view of a movable member in FIG. 9.
Figure 17:
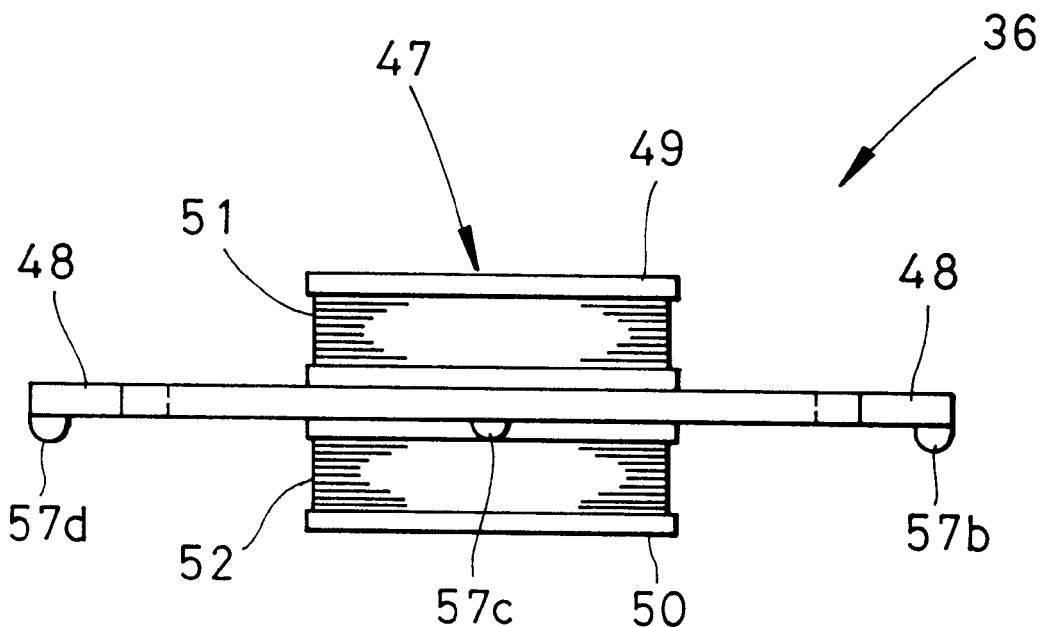
Figure 18:
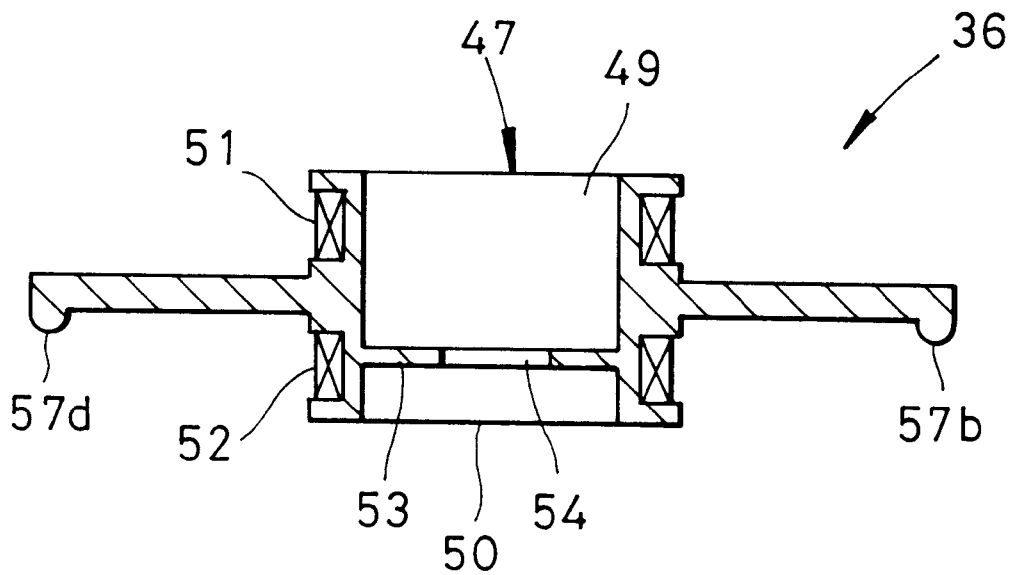

As shown in FIGS. 16, 17, and 18, the movable member 36 has a regular quadrangle having an almost same size as that of each of the first and second fixed members 34 and 35. A cylindrical bobbin portion 47 is provided in the center portion of the movable member 36 so as to be projected toward each of the fixed members 34 and 35. Guide notch portions 48 each having an almost semicircular shape are formed at four corners so that the supporting pipes 44 of the second fixed member 35 are loosely inserted into the guide notch portions 48. According to the cylindrical bobbin portion 47, a first bobbin portion 49 on one end side is loosely inserted into a space between the magnets 39a and 39b of the first fixing plate 34 and a second bobbin portion 50 on the other end side is loosely inserted into a space between the magnets 43a and 43b of the second fixed member 35. A conductive wire is wound around each of the first and second bobbin portions 49 and 50, thereby forming two coils 51 and 52 serving as coil means. A partition wall 53 is formed in the second bobbin portion 50 of the cylindrical bobbin portion 47. A quadrangular attaching hole 54 to which the transparent parallel flat plate 31 is attached is formed in the partition wall 53.

Screw holes 55 are formed at four positions where a circle in which a center point of the circular hole 37 is set to the center crosses at positions near the edge portions of two diagonal lines in the first fixed member 34, respectively. Four screws 56a to 56d for angle adjustment (only 56b is shown in FIG. 9) are attached into the screw holes 55 so as to be projected toward the movable member 36 side, respectively. Each of the angle adjusting screws 56a to 56d adjusts an inclination angle at the time of the operation of the movable member 36 by adjusting a projection length of the screw protruding to the movable member 36 side. Projecting portions 57a to 57d are formed at intermediate positions of respective side portions on the opposite surface of the movable member 36 which faces the second fixed member 35, respectively. As shown in FIG. 19, the movable member 36 is assembled between the first and second fixed members 34 and 35 so that it can be swung by the supporting pipes 44 and clamping screws 46. In this state, the movable member 36 is restricted by the angle adjusting screws 56a to 56d and projecting portions 57a to 57d so that the inclination angle at the time of the operation is set to be constant.

As shown in FIGS. 9 and 19, the movable member 36 is urged toward the first fixed member 34 by two coil springs 58a and 58b attached to the outer peripheries of the two supporting pipes 44 locating on the diagonal line between the second fixed member 35 and movable member 36. The coil springs 58a and 58b are set to a spring force of a degree such that when no current flows in the coils 51 and 52 of the bobbin portion 47, the movable member 36 is held in a neutral state in which it is almost perpendicular to the optical axis O and, when currents flow in the coils 51 and 52 and electromagnetic forces, which will be explained later, are developed between the magnets 39a and 39b and between the magnets 43a and 43b, the inclining operation of the movable member 36 is not obstructed.

A structure of the movable member will be further described.

In other words, therefore, the coils 51 and 52 are wound and supported around the side surface of the cylindrical member 32 so as to sandwich the flange portion 31 and the movable member 36 constructed as mentioned above is assembled so that it can freely swing in the space formed by being surrounded by the first and second fixed members 34 and 35. The swing axis is made up of a symmetrical axis of the magnets 39a and 39b and a symmetrical axis of the magnets 43a and 43b.

The first bobbin portion 49 has a hollow shape and this hollow space reaches the middle of the second bobbin portion 50. A portion of a flat plate shape having the cavity (attaching hole) 54 of an almost regular quadrangle is formed at the middle position in the hollow portion of the second bobbin portion 50. In this portion, driven members (not shown) are attached, for example, in a form of penetrating the cavity 54 and swing integrally with the movable member 36. As driven members, although a lens, a mirror, a prism, and other optical parts which are used in the image pickup apparatus or the like, or small parts such as electronic parts or the like as mentioned above are suitable, the invention can be also applied to the other members.

The stationary and movable parts with the above construction are assembled by the clamping screws 46 and angle adjusting screws 56a to 56d and have a cross sectional view as shown in FIG. 19. FIG. 19 corresponds to the cross sections taken along the lines A—A, B—B, and C—C. As will be also understood from FIG. 19, the movable member 36 is sandwiched by the first and second fixed members 34 and 35 with a gap by the cylindrical pipes (supporting pipes) 44. The gap is set in a manner such that even if the lengths corresponding to the projecting portions 57a to 57d and the projecting portions of the front edges of the male screws (angle adjusting screws) 56a to 56d are subtracted, the movable member 36 is sufficiently inclined in a predetermined direction or can be rotated at a predetermined angle. FIG. 19 draws a state in which the movable member 36 is floated between the fixed members in order to clearly show the gap where the movable member 36 can swing. An actual situation is not limited to this structure.

The operation of the electromagnetic actuator 32 will now be described.

Figure 20:
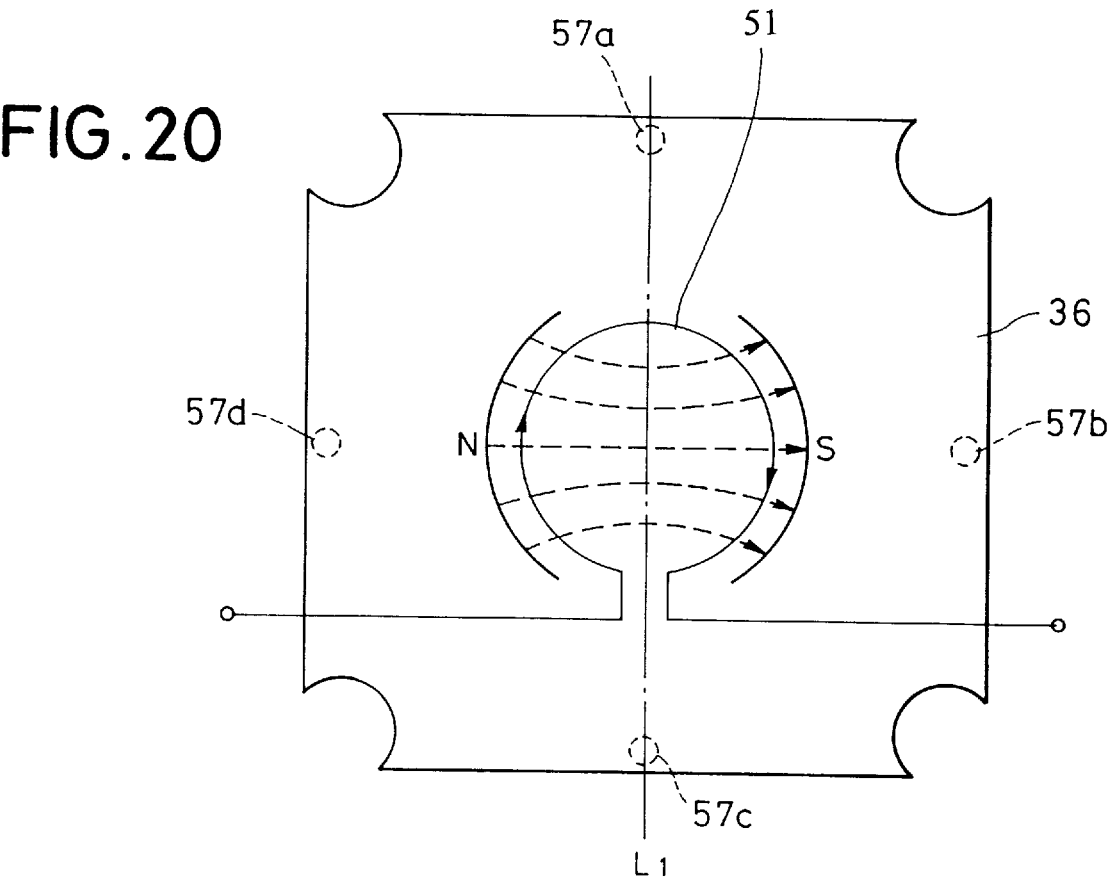
Figure 21:
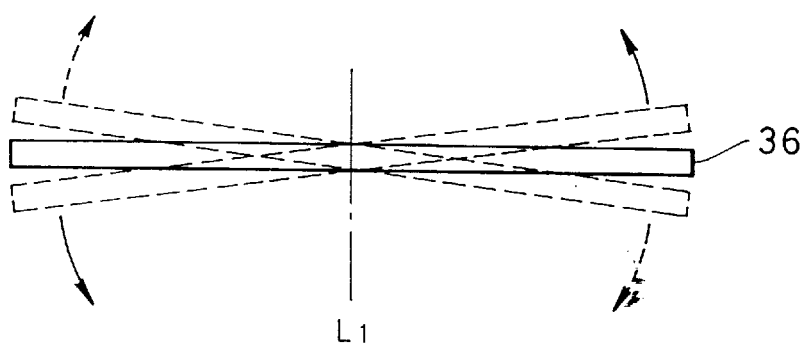

FIGS. 20 and 21 are a plan view and a side elevation of a model of the first fixed member 34 and movable member 36 of the electromagnetic actuator 32 and show an operating state between the first fixed member 34 and movable member 36. In FIG. 20, as shown by arrows of broken lines in the diagram, a magnetic flux by lines of magnetic force directing almost from the left to the right is generated between the first magnet 39a and second magnet 39b. The coil 51 provided for the movable member 36 crosses the magnetic flux on both of the N pole side and the S pole side.

In this state, when a current is supplied to the coil 51 in the direction of the arrow as shown in the diagram, in accordance with the Fleming's left-hand rule, as shown by arrows of solid lines in FIG. 20, the coil 51 generates an electromagnetic force in a depressing direction in the direction perpendicular to the paper surface on the N pole side and generates an electromagnetic force in a lifting-up direction in the direction perpendicular to the paper surface on the S pole side. When the current is supplied to the coil 51 in the reverse direction of the arrow direction shown in FIG. 20, contrarily, as shown by arrows of broken lines in FIG. 21, the coil 51 generates an electromagnetic force in the lifting-up direction in the direction perpendicular to the paper surface on the N pole side and generates an electromagnetic force in the depressing direction in the direction perpendicular to the paper surface on the S pole side. Thus, the movable member 36 almost receives a force by the electromagnetic force generated in the coil 51 such that the movable member 36 is inclined around a reference line L1, as a center, in the vertical direction passing through the center point of the movable member 36 in FIG. 20.

FIGS. 22 and 23 are a plan view and a side elevation of a model of the second fixed member 35 and movable member 36 of the electromagnetic actuator 32 and show an operating state between the second fixed member 35 and movable member 36. In FIG. 22, a magnetic flux by lines of magnetic force directing almost from the upper position to the lower position is generated between the first and second magnets 43a and 43b as shown by arrows of broken lines in the diagram. The coil 52 provided for the movable member 36 cross this magnetic flux on both of the N pole side and the S pole side.

In this state, when a current is supplied to the coil 52 in the direction of the arrow as shown in the diagram, in accordance with the Fleming's left-hand rule, as shown by arrows of solid lines in FIG. 23, the coil 52 generates an electromagnetic force in a depressing direction in the direction perpendicular to the paper surface on the N pole side and generates an electromagnetic force in a lifting-up direction in the direction perpendicular to the paper surface on the S pole side. When the current is supplied to the coil 52 in the reverse direction of the arrow direction shown in FIG. 22, contrarily, as shown by arrows of broken lines in FIG. 23, the coil 52 generates an electromagnetic force in the lifting-up direction in the direction perpendicular to the paper surface on the N pole side and generates an electromagnetic force in the depressing direction in the direction perpendicular to the paper surface on the S pole side. Thus, the movable member 36 almost receives a force by the electromagnetic force generated in the coil 52 such that the movable member 36 is inclined around a reference line L2, as a center, in the lateral direction passing through the center point of the movable member 36 in FIG. 22.

Figure 24:
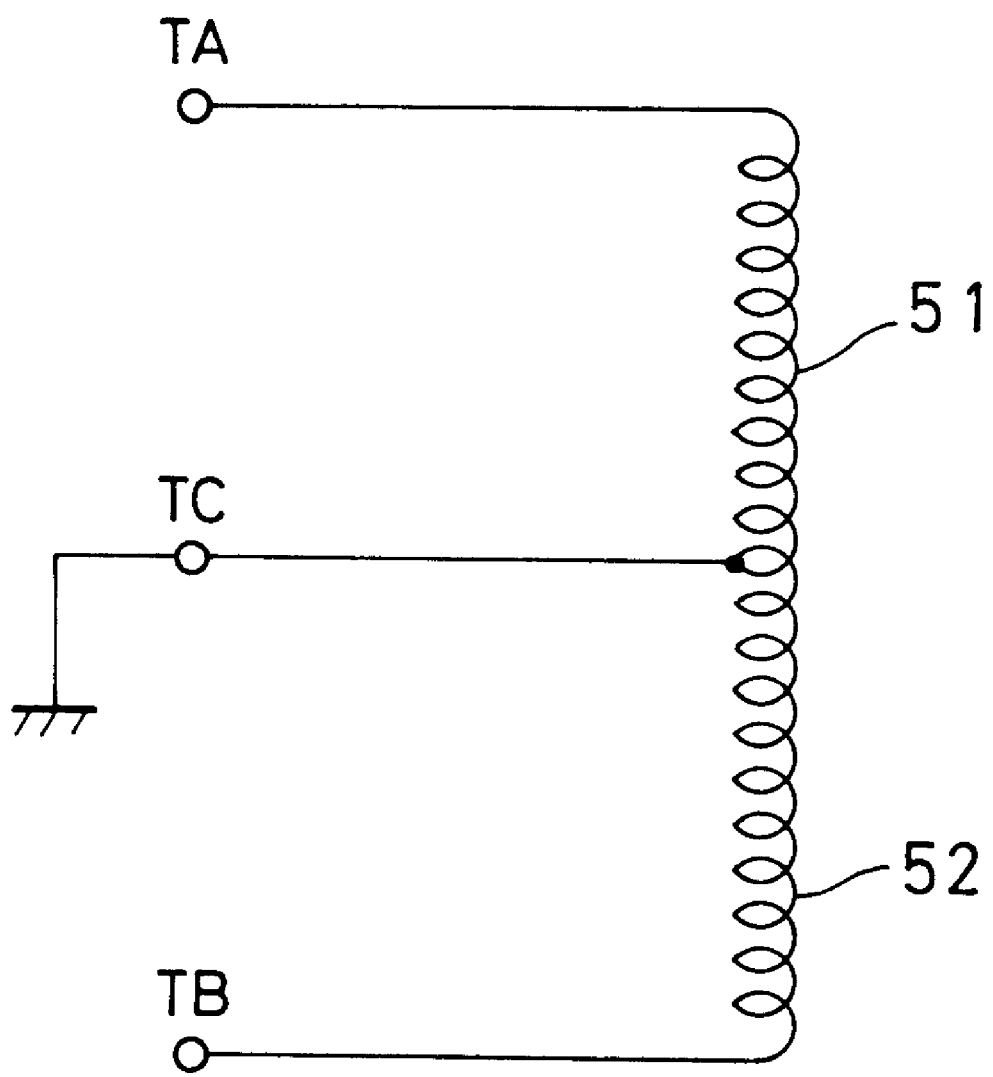
FIG. 24 is an electric connection diagram of two coils provided for the movable member in FIG. 9.

The coils 51 and 52 formed in the bobbin portion 47 of the movable member 36 are connected as shown in FIG. 24. That is, the coils 51 and 52 are mutually serially connected or are formed by dividing a series of continuous coil. One end of the coil 51 is led out as a terminal TA and one end of the coil 52 is led out as a terminal TB, respectively. A node or dividing point of the coils 51 and 52 is led out as a common terminal TC. A corresponding predetermined signal is supplied to each of the terminals TA and TB every operating format, which will be explained later. The common terminal TC is connected to the ground.

Four operating formats are set as shown in FIG. 25.

Figure 26:
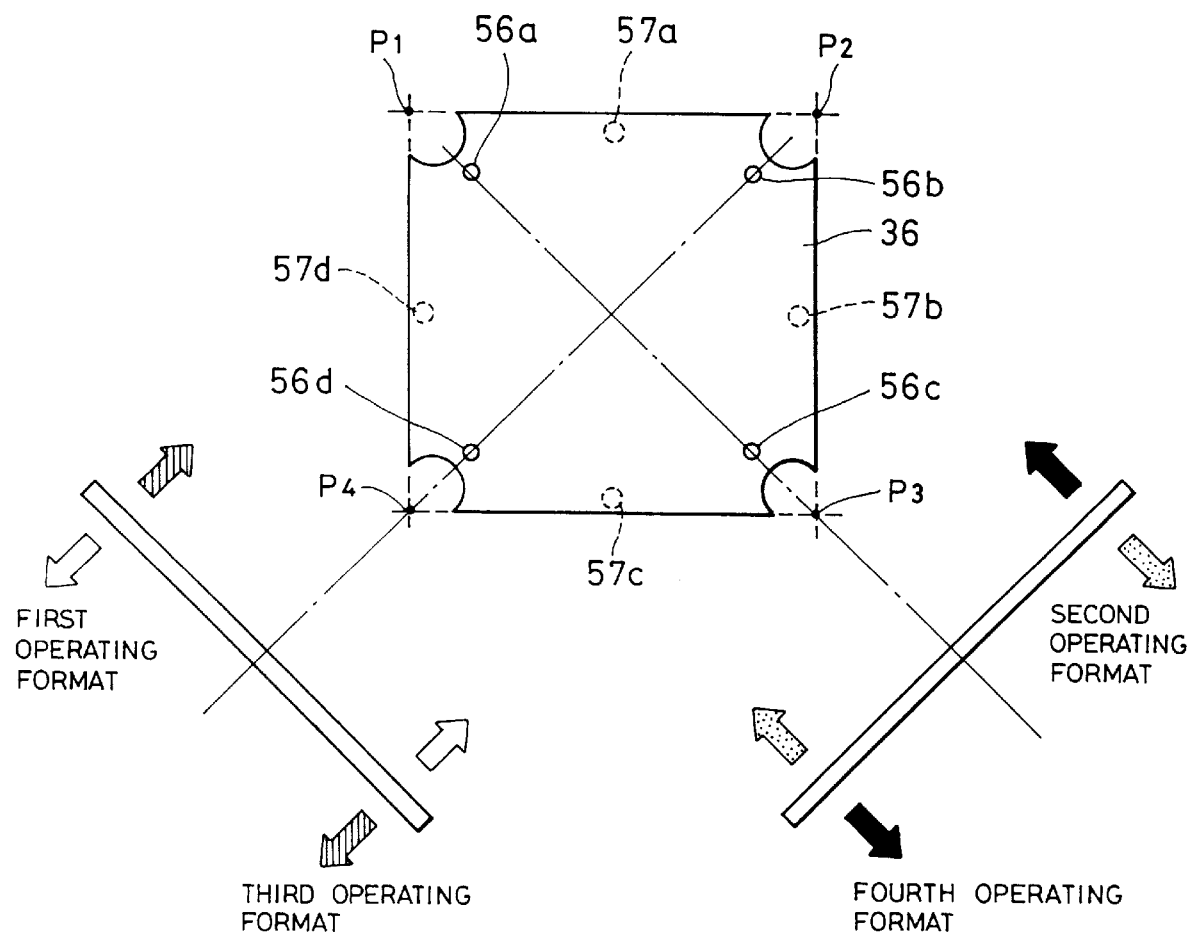
FIG. 26 is a diagram for explaining the operating state of the movable member in each operating mode of the electromagnetic actuator in FIG. 9.

In the first operating format, a positive voltage is supplied to both of the terminals TA and TB. Now, assuming that the positive voltage generates a current flowing in the directions of arrows written for the coils 51 and 52 in FIGS. 20 and 22 (a similar presumption shall also apply hereinbelow), a force for depressing the left side edge portion of the movable member 36 in the direction perpendicular to the paper surface and for lifting up the right side edge portion and a force for depressing the upper side edge portion of the movable member 36 in the direction perpendicular to the paper surface and for lifting up the lower side edge portion are simultaneously applied to the movable member 36. As shown in FIG. 26, the movable member 36, therefore, is inclined by a synthetic force (rotational force) of those two forces into a state in which a left upper corner portion P1 is depressed against the spring forces of the coil springs 58a and 58b and a right lower corner portion P3 is lifted up. The parallel flat plate 31 is also inclined together with the movable member 36. In FIG. 25, the direction of the arrow written in the column of the rotating (depressing) direction shows the side where the movable member 36 is eventually depressed, and the arrow written in each column of the TA/TB input voltages shows the side where a component force of the synthetic force depresses the movable member 36.

In the second operating format, a negative voltage is supplied to the terminal TA and a positive voltage is supplied to the terminal TB. In this instance, a force for depressing the right side edge portion of the movable member 36 in the direction perpendicular to the paper surface and for lifting up the left side edge portion and a force for depressing the upper side edge portion of the movable member 36 in the direction perpendicular to the paper surface and for lifting up the lower side edge portion are simultaneously applied to the movable member 36. As shown in FIG. 26, the movable member 36, therefore, is inclined by a synthetic force (rotational force) of those two forces into a state in which a right upper corner portion P2 is depressed against the spring force of the coil spring 58b and a left lower corner portion P4 is lifted up.

In the third operating format, a negative voltage is supplied to both of the terminals TA and TB. In this instance, a force for depressing the right side edge portion of the movable member 36 in the direction perpendicular to the paper surface and for lifting up the left side edge portion and a force for depressing the lower side edge portion of the movable member 36 in the direction perpendicular to the paper surface and for lifting up the upper side edge portion are simultaneously applied to the movable member 36. As shown in FIG. 26, the movable member 36, therefore, is inclined by a synthetic force (rotational force) of those two forces into a state in which the right lower corner portion P3 is depressed against the spring forces of the coil springs 58a and 58b and the left upper corner portion P1 is lifted up.

In the fourth operating format, a positive voltage is supplied to the terminal TA and a negative voltage is supplied to the terminal TB. In this instance, a force for depressing the left side edge portion of the movable member 36 in the direction perpendicular to the paper surface and for lifting up the right side edge portion and a force for depressing the lower side edge portion of the movable member 36 in the direction perpendicular to the paper surface and for lifting up the upper side edge portion are simultaneously applied to the movable member 36. As shown in FIG. 26, the movable member 36, therefore, is inclined by a synthetic force (rotational force) of those two forces into a state in which the left lower corner portion P4 is depressed against the spring force of the coil spring 58a and the right upper corner portion P2 is lifted up.

Figure 27:
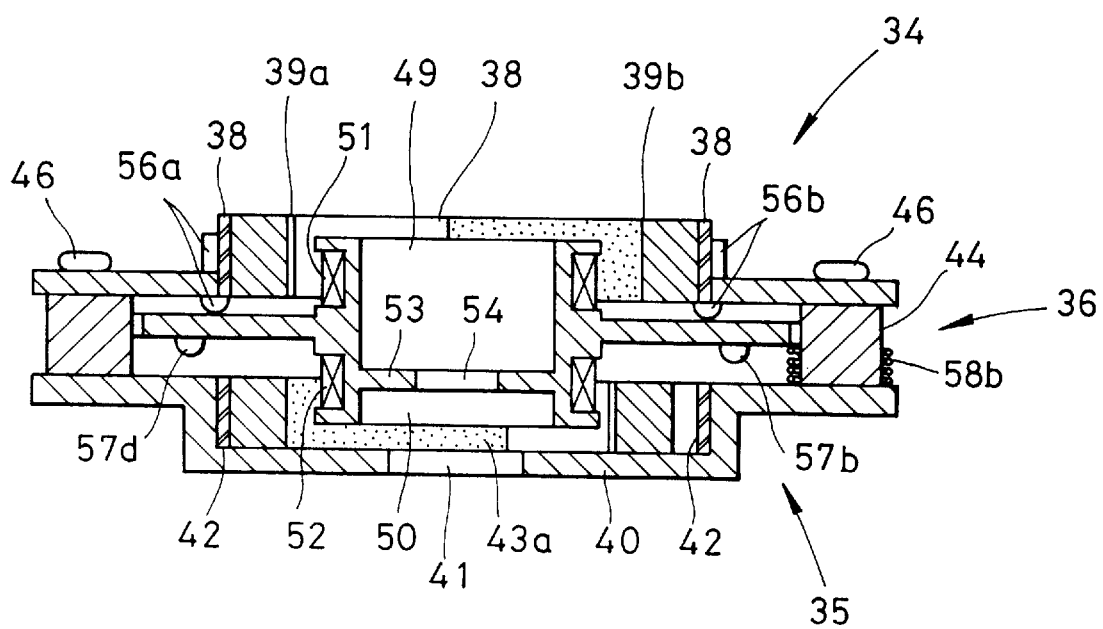
FIG. 27 is a cross sectional view showing an inclining state of the movable member in FIG. 19.

As mentioned above, when the movable member 36 is inclined in accordance with the first to fourth operating formats, respectively, the movable member 36 comes into contact with the front edge of any one of the four angle adjusting screws 56a to 56d of the first fixed member 34. At the same time, any two of the four projecting portions 57a to 57d of the movable member 36 come into contact with the second fixed member 35. For example, in the first operating format, as shown in FIG. 27, the movable member 36 comes into contact with the front edge of one angle adjusting screw 56c and two projecting portions 57a and 57d come into contact with the second fixed member 35. Similarly, in the second operating format, the movable member 36 comes into contact with the front edge of one angle adjusting screw 56d and two projecting portions 57a and 57b come into contact with the second fixed member 35. In the third operating format, the movable member 36 comes into contact with the front edge of one angle adjusting screw 56a and two projecting portions 57b and 57c come into contact with the second fixed member 35. In the fourth operating format, the movable member 36 comes into contact with the front edge of one angle adjusting screw 56b and two projecting portions 57c and 57d come into contact with the second fixed member 35.

The movable member 36 is, therefore, positioned by three fulcrums in the space between the first and second fixing plates 34 and 35 because the side to be depressed is supported by two of the four projecting portions 57a to 57d and the side to be lifted up is supported by one of the four angle adjusting screws 56a to 56d. Even if there is a variation in the electromagnetic force which is generated by the coils 51 and 52, therefore, the movable member 36 is always inclined in a predetermined inclining direction at a predetermined inclination angle.

As for the movable member 36, by changing a projection length of the front edge of each of the angle adjusting screws 56a to 56d by using a tool such as a driver or the like, the inclination angle of the movable member 36 is adjusted to an arbitrary angle. The inclination angle of the parallel flat plate 31 provided for the movable member 36, accordingly, can be set to an arbitrary angle by adjusting the angle adjusting screws 56a to 56d. For example, the light on the optical axis O shown in FIG. 8, consequently, is properly set to an inclination angle $\theta_1$ at which the image is deviated on the solid state image pickup device 29 by a pitch of 0.5 pixel or an inclination angle $\theta_2$ at which the image is deviated on the solid state image pickup device 29 by a pitch of one pixel.

Since the electromagnetic actuator 32 and transparent parallel flat plate 31 are also similarly used for the second parallel flat plate unit 28, in the following description, for convenience of explanation, as for the first parallel flat plate unit 27 for pixel interpolation, they are called a first electromagnetic actuator 32 and a first parallel flat plate 31, and with regard to the second parallel flat plate unit 28 for low pass filter, they are called a second electromagnetic actuator 62 and a second parallel flat plate 61.

Inclining states of the first and second parallel flat plates 31 and 61 corresponding to the first to fourth operating formats of the electromagnetic actuator 32 will be described by using different reference numerals every first and second parallel flat plates 31 and 61.

Figure 28:
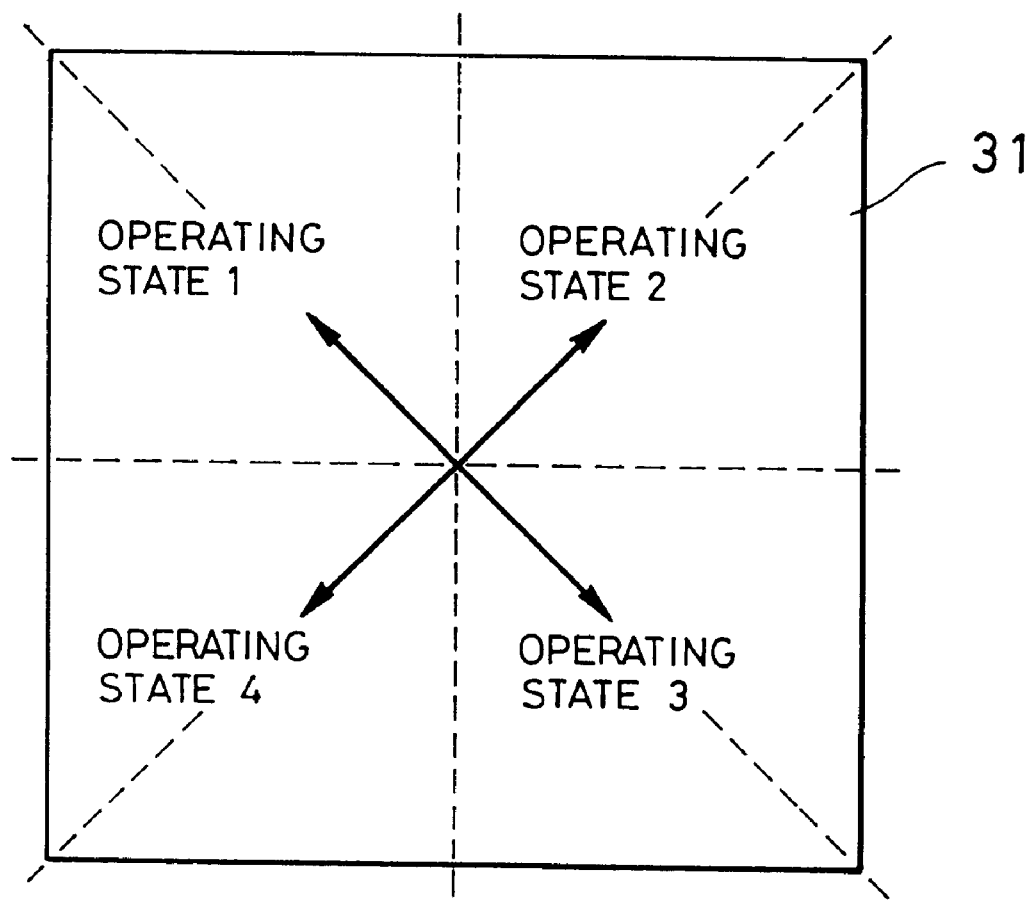
FIG. 28 is a diagram showing an inclining direction and an angle of inclination of the first parallel flat plate of the first parallel flat unit by arrows.

FIG. 28 is an inclining state diagram in which the inclining direction of the first parallel flat plate 31 is shown by the direction of an arrow and the inclination angle is shown by a length of arrow. In the diagram, an operating state 1 of the first parallel flat plate 31 corresponds to the first operating format of the electromagnetic actuator 32. Similarly, operating states 2 to 4 correspond to the second to fourth operating formats and the inclination angles in the operating states 1 to 4 are set to the inclination angle $\theta_1$ at which the image is deviated on the solid state image pickup device 29 by a pitch of 0.5 pixel.

Figure 29:
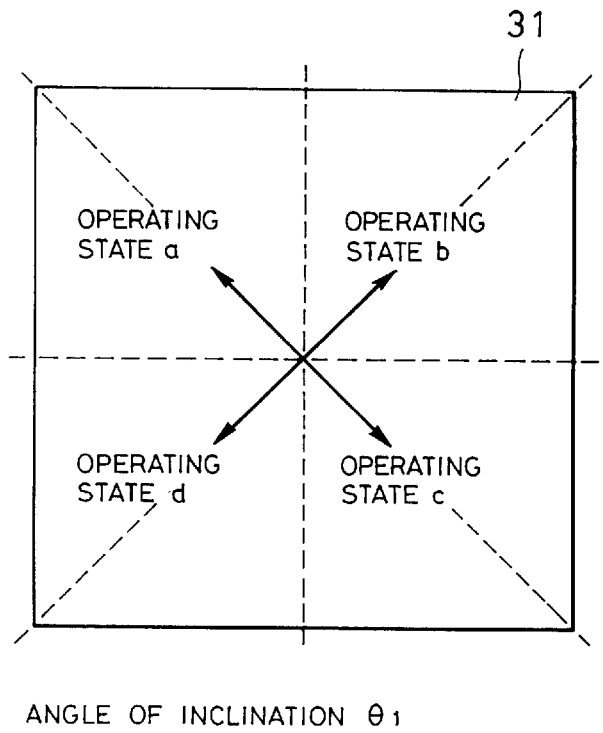
Figure 30:
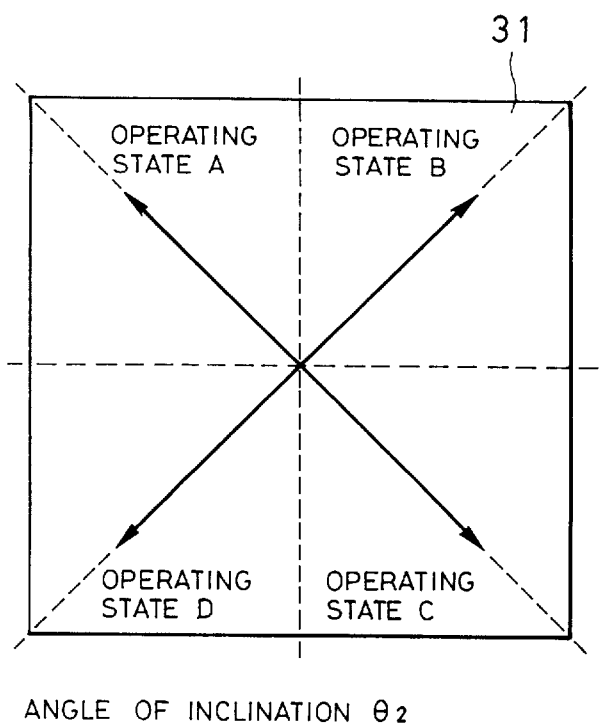

FIGS. 29 and 30 are inclining state diagrams in which the inclining direction of the second parallel flat plate 61 is shown by the direction of an arrow and the inclination angle is shown by a length of arrow. In FIG. 29, operating states a to d of the second parallel flat plate 61 correspond to the first to fourth operating formats of the electromagnetic actuator 32 and the inclination angle in the operating states a to d is equal to the inclination angle $\theta_1$ at which the image is deviated on the solid state image pickup device 29 by a pitch of 0.5 pixel. In FIG. 30, operating states A to D of the second parallel flat plate 61 corresponds to the first to fourth operating formats of the electromagnetic actuator 32. The inclination angles in the operating states A to D are equal to the inclination angle $\theta_2$ at which the image is deviated on the solid state image pickup device 29 by a pitch of one pixel.

A circuit construction of the electronic camera 1 will now be described with reference to FIG. 31.

The circuit construction comprises: the solid state image pickup device 29 such as a CCD or the like for converting an image of an object formed by the photographing lens unit 26 into an electric signal and generating; an A/D converter 65 for converting an analog signal from the solid state image pickup device 29 into a digital signal; a first driving circuit 66 for driving the solid state image pickup device 29; a second driving circuit 67 for driving the first electromagnetic actuator 32; a third driving circuit 68 for driving the second electromagnetic actuator 62; a timing generator 69 for generating timing signals to control the first to third driving circuits 66, 67, and 68; a DRAM 70 for temporarily storing the fetched digital image data; a compressing/decompressing circuit 71 for compressing or decompressing the digital image data by coding or decoding; a flash memory 72 for storing synthetic image data compressed as one picture plane; a CPU 76 which operates on the basis of a program stored in an ROM 73 and controls each unit on the basis of an input from a key input unit 75 by using an RAM 74 as a work RAM; a signal generator 77 for adding a sync signal to the digital image data and generating a digital video signal; a VRAM 78 for recording the digital video signal; a D/A converter 79 for converting the digital video signal generated from the signal generator 77 into an analog signal; the liquid crystal display (LCD) panel 5 for displaying an image on the basis of the analog video signal received through an amplifier 80; and an interface 81 for receiving and outputting an image signal or the like converted into a serial signal by the CPU 76.

The operation of the circuit constructed as mentioned above will now be described.

At the time of photographing, when the shutter button 8 of the key input unit 75 is operated, the timing signal is generated from the timing generator 69. By controlling at least the third driving circuit 68 between the second driving circuit 67 to drive the first electromagnetic actuator 32 and the third driving circuit 68 to drive the second electromagnetic actuator 62, the second electromagnetic actuator 62 is driven. By controlling the first driving circuit 66 of the solid state image pickup device 29, the image signal corresponding to the image of the object is extracted from the solid state image pickup device 29. The analog signal is converted into the digital signal by the A/D converter 65. The digital signal is temporarily stored as digital image data into the DRAM 70. The image data stored in the DRAM 70 is read into the CPU 76 and is subjected to a color arithmetic operating process, thereby forming a luminance signal and a chrominance signal from the image data. The luminance signal and chrominance signal are transferred to the compressing/decompressing circuit 71 and are data compressed. The synthetic image data of one picture plane is stored into the flash memory 72.

At the time of reproduction of the image, when the display key 13 of the key input unit 75 is operated, the compressed synthetic image data (compressed luminance signal and chrominance signal) of one picture plane is read out from the flash memory 72 by the CPU 76 and is transferred to the compressing/decompressing circuit 71 and is data decompressed. The decompressed luminance signal and chrominance signal are transferred to the signal generator 77 and the digital video signal is formed. The digital video signal is converted into the analog video signal by the D/A converter 79 and is displayed on the LCD panel 5.

The case of photographing the object by the electronic camera 1 will now be described. In the electronic camera 1, two kinds of photographing operations of a high resolution photographing for photographing once by exposing four times and a low resolution photographing for photographing once by exposing once can be performed.

In case of the high resolution photographing, by preliminarily operating the angle adjusting screws 56a to 56d of the first and second electromagnetic actuators 32 and 62, the inclination angles of the movable members 36 of both actuators are adjusted by the first and second parallel flat plates 31 and 61 to the inclination angle $\theta_1$ at which the light from the object is deviated on the solid state image pickup device 29 by a pitch of 0.5 pixel.

In this state, since no current flows in the coils 51 and 52 of the first and second electromagnetic actuators 32 and 62, the movable members 36 of the first and second electromagnetic actuators 32 and 62 are urged by spring forces of the two coil springs 58a and 58b and come into contact with the front edges of the angle adjusting screws 56a to 56d, so that the movable members 36 are held in a neutral state that is almost perpendicular to the optical axis O. After that, when the power switch 7 is turned on and the mode key 12 is set to the high resolution mode, the first and second electromagnetic actuators 32 and 62 are driven, thereby inclining each movable member 36 into a state of the first operating format. The first parallel flat plate 31, consequently, enters the operating state 1 shown in FIG. 28 at the inclination angle $\theta_1$, the second parallel flat plate 61 enters the operating state a shown in FIG. 29 at the inclination angle $\theta_1$, and the apparatus enters a state in which the photographing at the high resolution can be performed.

When the shutter button 8 is operated in this state, the first driving circuit 66 to drive the solid state image pickup device 29 is controlled by the timing signal from the timing generator 69. Synchronously with it, both of the second driving circuit 67 to drive the first electromagnetic actuator 32 and the third driving circuit 68 to drive the second electromagnetic actuator 62 are controlled. That is, when the solid state image pickup device 29 is driven, as shown in FIGS. 32A to 32C, the image of the object is received for the exposing time of one time. The image data of the first time received is transferred for a period of time from the end of the exposure of the first time to the start of the exposure of the second time. By repeating the above operations four times, the photographing of one time by the solid state image pickup device 29 is finished.

Synchronously with it, the first electromagnetic actuator 32 is driven, the first parallel flat plate 31 is held in the operating state 1 during the exposure of the first time, the movable member 36 is moved for the transfer time of the image data, and the first parallel flat plate 31 is set into the operating state 2. By sequentially repeating the above operations, the first parallel flat plate 31 is sequentially switched to the operating states 1 to 4 every exposing time. The image of the object, consequently, is sequentially deviated every exposure in the lateral and vertical directions on the solid state image pickup device 29 every pitch of 0.5 pixel. At the same time, the second actuator 62 is driven, the second parallel flat plate 61 is continuously switched to the operating states a to d for the exposing time of the first time and is returned to the operating state a. The second actuator 62 is at rest for the transfer time of the image data. By repeating the above operations every exposing time, the image of the object is sequentially deviated in the lateral and vertical directions on the solid state image pickup device 29 every pitch of 0.5 pixel for the exposing time of one time.

As mentioned above, when the photographing of one time is executed, the image of the object is sequentially deviated in the four directions every pitch of 0.5 pixel every exposure by the first parallel flat plate unit 27. Moreover, every state in which the image is deviated in each direction, the image of the object is further continuously deviated in the four directions every pitch of 0.5 pixel by the second parallel flat plate unit 28. The solid state image pickup device 29 sequentially receives the light of the image in those states every exposure of four times and transfers the image data. Four image data, thus, are derived by the photographing of one time. By synthesizing those four image data, the synthetic image data of one picture plane is formed.

According to the photographing, therefore, since the image of the object is sequentially deviated in the four directions every pitch of 0.5 pixel every exposure by the first parallel flat plate unit 27, the pixels are interpolated. Even if the number of pixels of the solid state image pickup device 29 is small, therefore, an image of a high resolution can be obtained. Since the image of the object is continuously deviated in the four directions every pitch of 0.5 pixel during the exposure of one time by the second parallel flat plate unit 28, the apparatus functions as a low pass filter. A high band frequency that is equal to or higher than the Nyquist frequency, therefore, can be eliminated, a deterioration of a picture quality due to a moire or color false signal occurring by the high band frequency can be prevented, and a good image can be derived.

In case of the photographing of a low resolution, by preliminarily operating the angle adjusting screws 56a to 56d of the second electromagnetic actuator 62, the inclination angle of the movable member 36 is adjusted so that it is equal to the inclination angle $\theta_2$ at which the image of the object is deviated on the solid state image pickup device 29 by a pitch of one pixel by the second parallel flat plate 61. When the power switch 7 is turned on and the mode key 12 is set into the low resolution mode, only the second electromagnetic actuator 62 is driven and the second parallel flat plate 61 is inclined in the operating state A shown in FIG. 30 at the inclination angle $\theta_2$. Since the first electromagnetic actuator 32 is not driven in this instance, the movable member 36 of the first electromagnetic actuator 32 is urged by the spring forces of the two coil springs 58a and 58b and is held in the neutral state in which it comes into contact with each front edge of the angle adjusting screws 56a to 56d. The apparatus, thus, enters a state in which the photographing of a low resolution can be performed.

When the shutter button 8 is operated in this state, although the first driving circuit 66 to drive the solid state image pickup device 29 and the third driving circuit 68 to drive the second electromagnetic actuator 62 are controlled by the timing signals from the timing generator 69, the second driving circuit 67 to drive the first electromagnetic actuator 32 is not controlled. When the solid state image pickup device 29 is driven in this manner, as shown in FIG. 26, the light of the image of the object is received for the exposing time of one time. After completion of the exposure, the image data is transferred and the photographing of one time is finished. The first electromagnetic actuator 32 is not driven in this instance but the first parallel flat plate 31 is held in the neutral state, so that the image of the object passes through the first parallel flat plate 31 as it is. The second electromagnetic actuator 62, however, is driven synchronously with the solid state image pickup device 29, the second parallel flat plate 61 is continuously switched to the operating states A to D and is returned to the operating state A for the exposing time of one time. The second actuator 62 is at rest for the transfer time of the image data. The image of the object, therefore, is sequentially deviated in the lateral and vertical directions on the solid state image pickup device 29 every pitch of one pixel for the exposing time of one time.

In the photographing, therefore, since the first parallel flat plate 31 of the first parallel flat plate unit 27 is held in the neutral state, the image of the object passes through the first parallel flat plate 31 in the same state at the time of each exposure. The image of the object, however, is continuously deviated in the four directions every pitch of one pixel during the exposure by the second parallel flat plate unit 28. Since the light of the image is received by the solid state image pickup device 29 and the image data is transferred, the image data derived by the exposure of one time becomes the image data of one picture plane as it is, so that the image of a low resolution can be obtained. Since the image of the object is continuously deviated in the four directions every pitch of one pixel during the exposure by the second parallel flat plate unit 28, the apparatus functions as a low pass filter. In a manner similar to the case of the high resolution photographing, accordingly, a high band frequency that is equal to or higher than the Nyquist frequency can be eliminated, a deterioration of the picture quality due to a moire or color false signal can be prevented, and a good image can be obtained. In the low resolution photographing, since a capacity of the image data of one picture plane is fairly smaller than that in case of the high resolution photographing, the number of images to be photographed can be remarkably increased.

Although the above embodiment uses the structure such that the movable members 36 of the electromagnetic actuators 32 and 62 are held in the neutral state by the two coil springs 58a and 58b, it is not always necessary to provide the coil springs 58a and 58b. In this case, it is sufficient that when the mode key 12 is switched to the low resolution mode, the first electromagnetic actuator 32 other than the second electromagnetic actuator 62 is also driven and each movable member 36 is inclined. In this instance, the inclination angle of the first parallel flat plate 31 can be set to any one of the angle $\theta_1$ at which the image of the object is deviated by a pitch of 0.5 pixel and the angle $\theta_2$ at which the image of the object is deviated by a pitch of one pixel. Moreover, the inclining direction of the first parallel flat plate 31 can be also set to only any one of the four directions.

In the embodiment, the first parallel flat plate unit 27 for pixel interpolation is arranged on the object side and the second parallel flat plate unit 28 for low pass filter is arranged on the solid state image pickup device 29 side. They can be also arranged, however, at the positions opposite to those arranging positions. A birefringence device such as a quartz plate or the like can be also used as a low pass filter in place of the second parallel flat plate unit 28.

In the above embodiment, the first electromagnetic actuator of the first parallel flat plate unit 27 for pixel interpolation is driven and controlled so that the first parallel flat plate 31 is inclined in only one direction every exposure. The invention is not limited to this construction but the first electromagnetic actuator can be also controlled so as to be inclined in four directions during the exposure of one time. With this method, since the apparatus can also function as a low pass filter while interpolating the pixels by the first parallel flat plate unit 27, there is no need to use the second parallel flat plate unit 28 and the birefringence device such as a quartz plate or the like, so that the structure can be simplified. Even in this case, by adjusting the inclination angle of the movable member 36 by operating the angle adjusting screws 56a to 56d, if the first parallel flat plate 31 is set to either the inclination angle $\theta_1$ or the inclination angle $\theta_2$, both of the high resolution photographing and the low resolution photographing can be performed.

Further, although the above embodiment has been described with respect to the case of using the electromagnetic actuator 32 as an actuator, the invention is not limited to it. For example, it is also possible to use a plurality of voltage resistive devices such as piezoelectric transducers or the like and to three-dimensionally incline the transparent parallel flat plate for the optical axis O. In this case, if two or more voltage resistive devices are used, the transparent parallel flat plate can be inclined in two or more directions. For instance, although the parallel flat plate 31 is inclined in the four directions in the embodiment, if four voltage resistive devices are used, the transparent parallel flat plate can be inclined in four or more directions. If eight voltage resistive devices are used, the transparent parallel flat plate can be inclined in eight or more directions.

Although the above embodiment shows the actuator of the moving coil type in which the coil is provided for the movable member and the magnet is provided for the fixed member, so long as a condition that two driving systems are constructed is satisfied, the synthetic force as mentioned above can be generated even by using a construction of a moving magnet type in which, contrarily, the magnet is provided for the movable member and the coil is provided for the fixed member. That is, at least two pairs of magnets forming independent magnetic fields are provided on the movable member side, two coils which individually cross the magnetic fields are provided on the stationary side, and the movable member can be driven by the synthetic force of a first electromagnetic force generated in one of the magnet pairs and a second electromagnetic force generated in the other magnet pair. It is also possible to use the movable member 36 in the embodiment as a stator and the fixed members 34 and 35 are used as movable members.

In the embodiment, although each of the magnets which face has an arc shape and the coil that is arranged in the space formed between the opposite magnets has a ring shape, various design changes are possible with respect to those shapes. In the embodiment, further, although there is a relation such that the driving directions for the movable members by the two driving systems perpendicularly cross each other, various design changes are possible with regard to this point.

Although the embodiment uses the 3-point supporting structure of two points on the lower side and one point on the upper side for the movable member 36 (flange portion), the invention is not limited to it but the numbers of supporting points on the upper side and lower side can be also reversed. The invention is not limited to the structure of supporting by the projections or projecting portions provided for the movable member 36 and first fixed member 34 but, for instance, predetermined projecting portions can be also provided for only the movable member 36 in place of the above structure. Other various structures can be also considered.

Although the example of the relation in which the rotational axis of the movable member 36 by one driving force and the rotational axis of the movable member by the other driving force perpendicularly cross each other has been mentioned, further, it is not always necessary to keep the relation such that both axes perpendicularly cross. Although the construction such that the movable member 36 is inclined in the four directions has been described above, it is also possible to drive the movable member 36 in the different number of directions.

Although there are limited descriptions in the above embodiment, the invention can be also properly modified within a range where those skilled in the art can design.

As described above, the electromagnetic actuator according to the invention can obtain a large driving force. A good response speed of generation of the driving force for the input control signal is obtained. The electromagnetic actuator, therefore, in which a settling performance to a predetermined driving position is good can be provided.

According to the invention as described above, by driving the actuator by the control means, inclining the parallel flat plate every exposure of a plurality of number of times and changing the emitting position for the incident position of the light, the image of the object is sequentially deviated on the solid state image pickup device, the image data derived by the exposure of a plurality of number of times is synthesized by the synthesizing means, and the synthetic image data of one picture plane is formed. Even if the solid state image pickup device in which the number of pixels is small is used, therefore, the image of a high resolution can be obtained.

The preferred embodiment of the present invention has been made. It will be obviously understood that those skilled in the art can presume many modifications and variations. All of the modifications and variations are incorporated in the scope of claims of the invention.

What is claimed is:

1. An electromagnetic actuator comprising:

permanent magnetic field generating means for generating a permanent magnetic field; and current path forming means movable relative to the permanent magnetic field generating means for forming a current path in the permanent magnetic field while conducting a current in response to an input control signal, wherein the permanent magnetic field generating means generates at least two permanent magnetic fields in substantially perpendicular directions, the current path forming means having at least two coaxial coils which cross the at least two permanent magnetic fields, respectively, and a driven member is driven by a relative movement occurring between the permanent magnetic field generating means and the current path forming means by at least two electromagnetic forces which are generated between the permanent magnetic field generating means and the coils.

2. An actuator according to claim 1, wherein a movement of the current path forming means relative to the permanent magnetic field generating means is caused by a combination of electromagnetic forces of the at least two electromagnetic forces.

3. An actuator according to claim 1, wherein:

the current path forming means includes a movable member supporting the coils and tiltable around first and second rotational non-parallel axes; and one of the electromagnetic forces tilts the movable member around a first rotational axis, and the other electromagnetic force tilts the movable member around the other rotational axis.

4. An actuator according to claim 3, wherein:

the permanent magnetic field generating means includes a stator comprising first and second fixed members surrounding the movable member and having a pair of magnets for each of the first and second fixed members; and wherein one pair of the magnets and the other pair of the magnets form non-parallel lines of magnetic forces.

5. An actuator according to claim 4, further including supporting portions for determining positions where the movable member comes into contact with the first and second fixed members.

6. An actuator according to claim 5, wherein the supporting portion further includes:

a first projecting portion for determining a position where the movable member and one of the first and second fixed members come into contact and on a surface of the movable member facing one of the first and second fixed members and a surface of one of the first and second fixed members facing the movable member; and a second projecting portion for determining a position where the movable member and the other one of the first and second fixed members come into contact and on a surface of the movable member facing the other one of the first and second fixed members and a surface of the other one of the first and second fixed members facing the movable member.

7. An actuator according to claim 6, wherein a stable position of the driven member is determined by the supporting portion.

8. An electromagnetic actuator comprising:

a movable plate;

a top plate above the movable plate;

a bottom plate below the movable plate;

a first magnet mounted on the top plate;

a second magnet mounted on the bottom plate, wherein the first magnet generates a first magnetic field that is non-parallel relative to a second magnetic field generated by the second magnet;

a first coil positioned on the movable plate in the first magnetic field; and a second coil positioned on the movable plate in the second magnetic field and substantially coaxial with the first coil, wherein the movable plate tilts in response to a control signal generating current in at least one of the first and second coils.

9. The actuator of claim 8, wherein the first magnet includes a first arcuate-shaped magnet and a second arcuate-shaped magnet.

10. The actuator of claim 9, wherein the second magnet includes a third arcuate-shaped magnet and a fourth arcuate-shaped magnet.

11. The actuator of claim 8, wherein the movable plate can tilt around two non-parallel rotational axes.

12. The actuator of claim 11, wherein the two non-parallel rotational axes are substantially perpendicular to each other.

13. The actuator of claim 11, wherein the first coil is connected in series to the second coil.

14. The actuator of claim 8, wherein the movable plate tilts in response to a combination of electromagnetic forces generated by the first coil and the second coil.

15. The actuator of claim 8, further including a plurality of projecting portions on a bottom surface of the movable plate, the plurality of projecting portions restricting the tilting of the movable plate relative to the bottom plate.

16. The actuator of claim 8, further including a spring to maintain the movable plate in a neutral position.

17. The actuator of claim 8, wherein the first magnetic field and the second magnetic field are substantially perpendicular to each other.

* * * * *